US006950908B2

(12) United States Patent
Shibayama et al.

(10) Patent No.: US 6,950,908 B2
(45) Date of Patent: Sep. 27, 2005

(54) SPECULATIVE CACHE MEMORY CONTROL METHOD AND MULTI-PROCESSOR SYSTEM

(75) Inventors: Atsufumi Shibayama, Tokyo (JP); Satoshi Matsushita, Tokyo (JP)

(73) Assignee: NEC Corporation, Tokyo (JP)

(*) Notice: Subject to any disclaimer, the term of this patent is extended or adjusted under 35 U.S.C. 154(b) by 237 days.

(21) Appl. No.: 10/191,401

(22) Filed: Jul. 10, 2002

(65) Prior Publication Data

US 2003/0014602 A1 Jan. 16, 2003

(30) Foreign Application Priority Data

Jul. 12, 2001 (JP) ........................................ 2001-212250

(51) Int. Cl.[7] .............................................. G06F 12/00
(52) U.S. Cl. ........................ 711/144; 711/121; 711/124; 711/146; 712/216
(58) Field of Search ................................ 711/141, 156, 711/130, 145, 146, 144; 712/216, 121, 124

(56) References Cited

U.S. PATENT DOCUMENTS

| | | | | |
|---|---|---|---|---|
| 5,907,860 | A | * | 5/1999 | Garibay et al. ............. 711/117 |
| 6,122,712 | A | * | 9/2000 | Torii ........................... 711/141 |
| 6,314,491 | B1 | | 11/2001 | Freerksen et al. |
| 6,341,336 | B1 | | 1/2002 | Arimilli et al. |
| 6,389,446 | B1 | | 5/2002 | Torii |
| 2002/0066005 | A1 | | 5/2002 | Shibayama et al. |

FOREIGN PATENT DOCUMENTS

| | | |
|---|---|---|
| JP | 5-224927 | 9/1993 |
| JP | 08-006805 | 1/1996 |
| JP | 10-027108 | 1/1998 |
| JP | 10-116192 | 5/1998 |
| JP | 2000-047887 | 2/2000 |
| JP | 2000-207233 | 7/2000 |
| JP | 3139392 | 12/2000 |
| JP | 2002-163105 | 6/2002 |
| WO | WO 02/01366 A2 | 1/2002 |

OTHER PUBLICATIONS

Steffan et al., "A Scalable Approach to Thread–Level Speculation," ACM, vol. 28, Issue 2, May 2000, pp. 1–12.*
Vijaykumar, T.N., et al., "Speculative Versioning Cache," IEEE, vol. 12, No. 12, Dec. 2001, pp. 1305–1317.*
"Superscalar Processor", written by Mike Johnson, Nikkei BP Publishing Center, 1994.

(Continued)

Primary Examiner—Matthew Anderson
Assistant Examiner—Shane Thomas
(74) Attorney, Agent, or Firm—Foley & Lardner LLP

(57) ABSTRACT

The processors #0 to #3 execute a plurality of threads whose execution sequence is defined, in parallel. When the processor #1 that executes a thread updates the self-cache memory #1, if the data of the same address exists in the cache memory #2 of the processor #2 that executes a child thread, it updates the cache memory #2 simultaneously, but even if it exists in the cache memory #0 of the processor #0 that executes a parent thread, it doesn't rewrite the cache memory #0 but only records that rewriting has been performed in the cache memory #1. When the processor #0 completes a thread, a cache line with the effect that the data has been rewritten recorded from a child thread may be invalid and a cache line without such record is judged to be effective. Whether a cache line which may be invalid is really invalid or effective is examined during execution of the next thread.

18 Claims, 12 Drawing Sheets

OTHER PUBLICATIONS

"Speculative Versioning Cache", written by S. Gopal, T.N. Vijaykumar, J.E. Smith, G.S. Sohi et al., In Proceeding of the 4$^{th}$ International Symposium on High–Performance Computer Architecture, Feb. 1998.

Nakamura et al., "Speculative memory access mechanism for thread–level speculation," INSTITUTE OF ELECTRONICS INFORMATION AND COMMUNICATION ENGINEERS, TECHNICAL RESEARCH REPORTS, Apr. 6, 2001, vol. 101, No. 2, pp. 81–88.

Torii, Sunao, "Architecture of the Meriot 1–chip control parallel processor," YEAR 2000 MEMORIAL PARALLEL PROCESSING SYMPOSIUM JSPP2000, May 30, 2000, pp. 81–93.

Koike, Hanpei, "On chip–multiprocessors with support mechanisms for execution profiling and speculative execution," INFORMATION PROCESSING SOCIETY RESEARCH REPORTS, Jan. 26, 2001, vol. 2001, No. 10, (2001–ARC–141), pp. 47–52).

Torii et al., "Control parallel on–chip multi–processor: MUSCAT," PAPERS OF THE PARALLEL PROCESSING SYMPOSIUM JSPP '97, May 28, 1997, pp. 229–236.

Ootsu et al., "Speculative multi–threading with selective multi–path execution," INFORMATION PROCESSING SOCIETY RESEARCH REPORTS, Aug. 7, 1998, vol. 98, No. 70 (98–ARC–130), p. 61–66.

Ogawa et al., "Evaluation of an on–chip multiprocessor architecture SKY," INFORMATION PROCESSING SOCIETY RESEARCH REPORTS, Nov. 27, 1999, vol. 99, No. 100 (99–ARC–135), pp. 17–24.

Ohsawa et al., "Blended multi–thread processing for MUSCAT," INFORMATION PROCESSING SOCIETY RESEARCH REPORTS, Aug. 4, 1999, vol. 99, No. 67 (99–ARC–134), pp. 169–174.

Kobayashi et al., "A proposal of a processor for multi–threading using interleaving threads mechanism," INFORMATION PROCESSING SOCIETY RESEARCH REPORTS, Nov. 27, 1999, vol. 99, No. 100 (99–ARC–135), pp. 45–50.

* cited by examiner

SPECULATIVE CACHE MEMORY CONTROL METHOD AND MULTI-PROCESSOR SYSTEM

BACKGRAOUNDS OF THE INVENTION

1. Field of the Invention

The present invention relates to a data processor such as a microprocessor and the like, and especially to improvement in performance of a microprocessor. More particularly, it relates to a cache memory control method of a microprocessor for executing a plurality of threads simultaneously.

2. Description of the Related Art

As a technique for improving the performance of a microprocessor, a non-program sequence execution (out-of-order execution) technique in which instructions are executed in a different order from that defined by a program executed by a microprocessor has been widely used hitherto. In case of the non-program sequence execution, a processor starts the execution from an instruction which has become executable, thereby improving the performance of the processor as compared with the program sequence execution (in-order execution) in which instructions are executed in the order defined by a program.

The non-program sequence execution, however, is not performed unconditionally. Especially as for instructions of having access to a memory (memory access instruction), consideration should be given to a dependence on a memory, in the non-program sequence execution. Generally, the memory access instructions include a load instruction for reading out data from a memory and a store instruction for writing data into a memory. If two instructions, a load instruction and a store instruction, appearing in a program have the target addresses different from each other, the different positions on the memory become the target of reading or writing operation, and therefore, there exists no dependence on the memory between the load instruction and the store instruction. In a short, these two instructions are executable in the non-program sequence.

While, when two instructions of the load instruction and the store instruction appearing in a program have the same target addresses as each other, the same position on the memory becomes the target of reading or writing operation and there exists a dependence on the memory between the load instruction and store instruction. For example, when a load instruction reads out data from an address, to which the data is stored by a store instruction prior to the load instruction in program sequence, this means that there is a flow dependence on the memory from the prior store instruction to the post load instruction. In this case, these two load instruction and store instruction are executed in an inverse sequence to the program sequence, the meaning of the program is changed and it is impossible to obtain the correct result of the execution of the program. Namely, when there is a flow dependence on the memory, it is impossible to execute the instructions in the non-program sequence. Similarly, when a store instruction writes data into an address, from which the data is read out by a load instruction prior to the store instruction in the program sequence, this means that there is an anti-dependence from on the memory from the prior load instruction to the post store instruction. When a store instruction writes data into an address, into which the data is written by a store instruction which is prior to the store instruction in the program sequence, this means that the there is an output dependence on the memory from the prior store instruction to the post store instruction. In either case, if executing these two load/store instructions in an inverse order to the program sequence, the meaning of the program is changed and it is impossible to obtain the correct result of the execution of the program.

In order to solve an anti-dependence and an output dependence on the memory, there has been hitherto known a technique of temporarily storing the data written by the store instruction in a buffer (generally, called as a store buffer), thereby enabling the non-program sequence execution. While, when there is a flow dependence, essentially, instructions cannot be executed in the non-program sequence, but in the program sequence. However, the target addresses of the load/store instructions have been unknown until the execution of the instructions, and therefore, the failure in the non-program sequence execution is a serious problem on the performance of a processor.

As for this problem, there has been known a conventional technique of data dependency speculative execution in which instructions are speculatively executed in the non-program sequence, assuming that there exists no flow dependence, before the presence of a flow dependence is turned out. The data dependency speculative execution includes the case of succeeding in the speculative execution when actually there exists no flow dependence and the case of failing in the speculative execution when actually there exists a flow dependence, and when presence or absence of a flow dependence is turned out, it is necessary to determine this case belongs to which case. When the speculative execution results in success and there is no flow dependence actually, execution of the following instructions can be continued as they are, and the performance of the processor can be improved by the data dependency speculative execution according to the non-program sequence. While, when the speculative execution results in failure and there is a flow dependence actually, the meaning of the program is changed and it is impossible to assure the correct result of the execution of the program. Therefore, the result obtained by the data dependency speculative execution in the non-program sequence is canceled, and the recovery processing for the failure in the data dependency speculative execution, such as retrying in the program order, is necessary. When the speculative execution results in failure, the canceling and recovery processing for the failure instruction is likely to deteriorate the performance compared with the execution in the program sequence. However, if a probability of success in the speculative execution is much higher than a probability of failure in the speculative execution, a high performance on the whole can be achieved. The details of the non-program sequence execution are described in the article, "Superscalar Processor" written by Mike Johnson, Nikkei BP Publishing Center, 1994. Further, as the recovery processing method for the failure in the speculative execution, there is a technique disclosed in, for example, Japanese Patent Publication Laid-Open No. 5-224927.

Recently, noted is thread parallel processing for speeding up the program execution by dividing a single program or a plurality of programs into a plurality of parts of program, called as a thread, and processing the respective threads in parallel by a plurality of processors. A thread is a unit of the parts of a program, and an instruction string consisting of a plurality of instructions, and there is a case of defining the sequential relationship among several threads. For example, when two threads belonging to the same program is respectively defined as T0 and T1, definitely there exists the sequential relationship caused by the positional relation of T0 and T1 within the program. If T0 is positioned prior to T1 in a program, T0 is expected to be executed prior to T1 on the meaning of the program. To the contrary, if T1 is positioned prior to T0 in a program, T1 is expected to be executed prior to T0 on the meaning of the program. In the thread parallel processing, considering a dependence on the memory caused by the sequential relationship of the threads, the threads are executed in parallel regardless of the sequential relationship of the threads while assuring the correct result of the execution of the program, thereby speeding up the execution of the program. In comparison with the non-program sequence execution of the instruction unit, it may be said as the non-program sequence execution of the thread unit.

In order to get the correct result of the execution of the program, it is necessary to resolve and assure a dependence between instructions included in threads also in the non-program sequence execution by the thread unit. As for a flow dependence on the memory, however, it is necessary to execute instructions essentially in the program sequence, similarly to the non-program sequence execution by the instruction unit, and if definitively performing the program sequence execution, high performance of the non-program sequence execution cannot be obtained. Especially, in the non-program sequence execution by the thread unit, the non-program sequence execution is prevented by the unit of thread consisting of a plurality of instructions, which becomes a serious problem. In order to cope with this problem, the data dependency speculative execution is effective, similarly to the non-program sequence execution by the instruction unit. Namely, assuming that there is no flow dependence before the presence of a flow dependence between instructions included in threads is turned out, the threads are speculatively executed in the non-program sequence, which is the data dependency speculative execution by the thread unit.

While, as for an anti-dependence and an output dependence on the memory, the data written by a store instruction is temporarily stored in a memory and a buffer inherent to the processor, similarly to the non-program sequence execution by the instruction unit, thereby to solve the anti-dependence or the output dependence, which enables the non-program sequence execution.

As for the thread parallel processing in a multiprocessor system formed by a plurality of processors respectively having the individual cache memories, for example, Japanese Patent Publication Laid-Open No. 3139392 (hereinafter referred to as article 1) discloses a control method of a cache memory for canceling an anti-dependence and an output dependence on a memory.

FIG. 11 is a view showing an example of the structure of a multiprocessor system according to the article 1. Referring to FIG. 11, the multiprocessor system according to the article 1 comprises four thread execution units #0 to #3 (reference numeral 100), four cache memories #0 to #3 (reference numeral 101), four consistency maintaining units #0 to #3 (reference numeral 102), a shared bus (reference numeral 103), and a main memory (reference numeral 104).

The thread execution unit #0 is connected to the cache memory #0 and the consistency maintaining unit #0; the thread execution unit #1 is connected to the cache memory #1 and the consistency maintaining unit #1; the thread execution unit #2 is connected to the cache memory #2 and the consistency maintaining unit #2; and the thread execution unit #3 is connected to the cache memory #3 and the consistency maintaining unit #3, and they execute the threads in parallel. The consistency maintaining units #0 to #3 are connected with each other and with the main memory 104 through the shared bus 103, so to control transfer of memory data which is the target of a memory access instruction to and from the other consistency maintaining units and the main memory. At this time, considering an anti-dependence and an output dependence on the memory, the system tries to maintain the consistency between the memory data.

The maintaining method of the consistency between the memory data will be described in detail. When some thread execution unit executes a store instruction, the store data corresponding to the store instruction is stored in the cache memory corresponding to the thread execution unit, and also stored in a cache memory corresponding to a thread execution unit for executing a thread which is posterior in the program sequence to the thread executed by the above thread execution unit.

If a thread positioned prior in the program sequence to the thread executed by some thread execution unit, is executed by one of the other thread execution units, writing the store data corresponding to the store instruction stored in the cache memory inherent to the thread execution unit into the main memory is prohibited.

If a thread executed by a thread execution unit (self-thread) is positioned prior in the program sequence to the thread executed by one of the other thread execution units and the execution of the self-thread is finished, the store data of all the store instructions stored in the cache memory corresponding to the above thread execution unit is written into the main memory, and then all the data on the cache memory is invalidated.

When a cache miss occurred in a cache memory inherent to some thread execution unit, if there exists data of the same address as the address where the cache miss occurred, in a cache memory inherent to a thread execution unit which executes a thread positioned prior in the program sequence to the thread executed by the above thread execution unit, the data is transferred to the cache memory where the cache miss occurred, while if there exists no data of the same address as the address where the above cache miss occurred, the data is transferred from the main memory to the cache memory where the cache miss occurred.

By controlling the above operations, the consistency maintaining units #0 to #3 solve an anti-dependence and an output dependence on the memory, thereby realizing the non-program sequence execution by the thread unit. While, the multiprocessor system according to the article 1 doesn't cope with a flow dependence and when there is a possibility of existing a flow dependence, it cannot execute threads in the non-program sequence.

As for the thread parallel processing in a multiprocessor system formed by a plurality of processors respectively having inherent cache memories, a method of controlling a cache memory so as to cope with a flow dependence, in addition to an anti-dependence and an output dependence on a memory, is described in, for example, "Speculative Versioning Cache" written by S. Gopal, T. N. Vijaykumar, J. E. Smith, G. S. Sohi et al, In Proceedings of the 4th International Symposium on High-Performance Computer Architecture, February 1998 (hereinafter, referred to as article 2).

FIG. 12 is a view showing an example of the structure of a multiprocessor system according to the article 2. Referring to FIG. 12, the multiprocessor system according to the article 2 comprises four processors #0 to #3 (reference numeral 110), four SVCs #0 to #3 (reference numeral 111) that are cache memories, a snoop bus (reference numeral 112), a bus arbiter/version control logic (reference numeral 113), and a main memory (reference numeral 114).

The processor #0 is connected to the SVC #0; the processor #1 is connected to the SVC #1; the processor #2 is connected to the SVC #2; and the processor #3 is connected to the SVC #3, and they execute threads in parallel. The respective SVCs #0 to #3, under the control of the bus arbiter/version control logic 113, transfer the memory data that is the target of a memory access instruction, to and from the other SVCs and the main memory through the snoop bus 112. At this time, considering an anti-dependence and an output dependence on the memory, the system plans to maintain the consistency between the memory data. The SVC is provided with a function of detecting a flow dependence on the memory and a function of canceling the result of the speculative thread execution, and when detecting a flow dependence, it retries a thread, hence to realize the data dependency speculative execution.

The cache line forming the SVC includes entries for storing pointers indicating the other SVCs therein, and-when the respective SVCs hold the data of the same address, it stores the relationship of the data in the program sequence in a form of a linear list structure. The bus arbiter/version control logic 113 controls the dependence on the memory with reference to this linear list structure.

The characteristic of the operation of the multiprocessor system including the SVCs, according to the article 2, will be described in detail. At first, when some processor executes a speculative load instruction on a flow dependence, a flag indicating that the speculative load instruction has been executed is set to a cache line including the data of this load instruction, the cache line existing in the SVC inherent to the corresponding processor.

When some processor P0 executes a store instruction, the store data of the store instruction is stored in the SVC inherent to the processor P0. Simultaneously, when there exists data of the same address as that of the store instruction, in the SVC inherent to the processor P1 executing the thread S1 which is positioned posterior in the program sequence to the thread S0 executed by the processor P0 and the data is not updated by a thread positioned posterior to the thread S0 in the program sequence, the cache line including the data of the same address as that of the store instruction existing in the SVC of the processor P1 is invalidated. Further, when a flag indicating that the speculative load instruction has been executed is set at the cache line, it is determined that the system has failed in the speculative execution of the load instruction and has a function of requesting the processor P1 a cancel and a retry of the thread execution.

When a thread positioned prior in the program sequence to a thread executed by a processor is executed by one of the other processors, the store data of the store instruction stored in the SCV inherent to the above processor is prohibited from being written back into the main memory.

When a thread executed by a processor is positioned prior in the program sequence to a thread which is being executed by one of the other processors and the execution of the thread is finished, a flag indicating that the data has been determined is set to all the cache lines stored in the SVC inherent to the processor. While, when a memory access instruction gains access to the SVC, if a flag indicating that the data of the cache line of the access target has been determined is being set there, the bus arbiter/version control logic 113 obtains an effective cache line with reference to all the SVCs.

When a cache miss occurred in an SVC inherent to a processor, if there exists data of the same address as that of the above cache miss, in the SVC inherent to the processor of executing a thread positioned prior in the program sequence to the thread executed by the processor, the data is transferred to the SVC where the cache miss occurred, while if there exists no data of the same address as that of the above cache miss, the data is transferred from the main memory to the SVC where the cache miss occurred.

Namely, the SVC according to the article 2 stores and controls the positional relationship in the program sequence of the data held by the respective SVCs, by the unit of cache line, explicitly in a form of a linear list structure, and according to the above, the bus arbiter/version control logic 113 controls the memory dependence.

In the cache memory control method disclosed in the above article 1, however, when the execution of a thread is finished and the data is determined, writing of all the data updated by the same thread, into the main memory, occurs in a concentrated way, and therefore especially when the size of a thread is small, the performance of a program is deteriorated. Since all the data on the cache memories are invalidated, a lot of cache miss occurs in the next executed thread, which deteriorates the execution performance of a program. Further, when there is a flow dependence on the memory, since the threads cannot be executed in parallel in the non-program sequence, the execution performance of a program is deteriorated.

The cache memory control method described in the above article 2 can avoid the above problem of the article 1. According to the above method, however, when executing a writing operation of a store instruction, since the data held by the SVC of the processor that executes a thread positioned posterior in the program sequence is invalidated, a lot of cache miss occurs in the case of a large communication between threads and the execution performance of a program is deteriorated. Further, in order to invalidate data, it is necessary to store and control the flag indicating the state of the data and the linear list structure indicating the sequential relationship of the data by the unit of the write data by a store instruction, and therefore, it has a problem that the hardware amount becomes large. Since the above method maintains the positional relationship in the program sequence of the data by the linear list structure, especially when the list is cut down caused by a cancel of the thread execution, the processing of dependence becomes complicated and therefore high speed processing becomes difficult.

SUMMARY OF THE INVENTION

In consideration of the above problems, an object of the present invention is to provide a cache memory control method capable of speeding up the thread parallel processing, even when the size of the threads is small and the communication between the threads is large, the cache memory control method solving a dependence on a memory as for the thread parallel processing in a multiprocessor system formed by a plurality of processors respectively including the individual cache memories.

Another object of the present invention is to provide a cache memory control method in which the necessary hardware amount can be reduced.

Further another object of the present invention is to provide a cache memory control method capable of speeding up the processing at ease by a simple control with small power consumption.

In order to achieve the above object, the present invention is to provide, in a multiprocessor system formed by a plurality of processors respectively having the individual cache memories, a cache memory control method and the multiprocessor system capable of efficiently solving a dependence on a memory between threads.

According to one aspect of the invention, a cache memory control method in a multiprocessor system, formed by a plurality of processors respectively having inherent cache memories, for executing a plurality of threads whose execution sequence is defined, in which when a processor executing a thread writes data, the processor writes the data in a cache memory inherent to the thread executing processor; when there is a cache line corresponding to a writing target address of the data, in a cache memory inherent to a processor executing a thread positioned posterior to the above thread in the execution sequence, the processor updates the cache memory; and when there is a cache line corresponding to the writing target address of the data, in a cache memory inherent to a processor executing a thread prior to the above thread in the execution sequence, the processor records that the thread executing processor has written data into the cache line.

In the preferred construction, a store flag which is set at a writing time and reset at a completion of a thread in a processor, for controlling writing execution of the processor inherent to a cache memory, by the unit of writing data width, is provided in every cache line forming the cache memory, and in the update processing, a possibility of updating a target cache line of update processing and an update target data portion are decided with reference to content of the store flag of a cache line in a target cache memory of the update processing and content of the store flag of a cache line existing in a cache memory inherent to a processor executing a thread positioned in the execution sequence between the above thread and a thread executed by a processor having a target cache memory of the update processing.

In another preferred construction, an update objective flag for storing that a processor has written data, for every processor executing a thread positioned posterior in program sequence and an update effective flag indicating whether the update objective flag is effective or not, are provided in every cache line forming the cache memory, and when a thread executing processor gains access to a cache line in a cache memory inherent to the self-processor, hence to find that the update objective flag and the update effective flag are both effective, whether the cache line is effective or invalid is determined, referring to whether or not there is a cache line of the writing target address in the cache memory inherent to the above processor having written the data, which is proved by the update objective flag, and when it is invalid, effective data is transferred from a cache memory inherent to the other processor or a main memory, so to be stored in the cache line.

In another preferred construction, an update objective flag for storing that a processor has written data, for every processor executing a thread positioned posterior in program sequence and an update effective flag indicating whether the update objective flag is effective or not, are provided in every cache line forming the cache memory, and when the other processor gains access to a cache line in a cache memory inherent to a thread executing processor, hence to find that the update objective flag and the update effective flag are both effective, whether the cache line is effective or invalid is determined, referring to whether or not there is a cache line of the writing target address in a cache memory inherent to the above processor having written the data, which is proved by the update objective flag, and when it is invalid, this cache line is invalidated.

In another preferred construction, when a processor executing a thread positioned posterior in program sequence writes data, a buffer for storing the writing target address and the write data is provided, and upon completion of execution of a thread, when there is a cache line corresponding to the address stored in the buffer, data of the address stored in the buffer is written into the cache line.

In another preferred construction, a share flag for storing which processor to share data with is provided in every cache line forming the cache memory, a data sharing processor is specified with reference to the share flag when a processor supplies a bus request, and the bus request is supplied only to the data sharing processor.

In another preferred construction, when data of a cache line is speculative, a speculation flag for showing to the effect that the data is speculative and specifying a processor that is a cause of the speculative data, is provided in every cache line forming the cache memory, and when the execution of a thread is canceled in a processor and further canceled also in the other processor that is the cause of a speculative cache line, of the speculative cache lines existing in the cache memory inherent to the processor, this cache line is invalidated.

In another preferred construction, a cache control unit is provided in every cache memory, and the cache control units are connected with each other through a bus and the respective cache control units and a main memory shared among the processors are mutually connected through a bus, and in every cache line of the cache memory, provided are an effective flag indicating whether the cache line is effective or invalid, an update flag indicating whether the cache line disagrees with the main memory, a share flag indicating whether the cache line is shared with which processor, a speculation flag indicating whether the cache line includes speculative data and specifying a processor that is the cause of the speculative data when it includes, an update objective flag for storing into the cache line to the effect that a processor has written data, for every processor executing a thread positioned posterior in execution sequence, an update effective flag indicating that when one of the update objective flags is set, the cache line has been updated by a processor corresponding to the set update objective flag and it may be invalid, a store flag indicating presence or absence of writing into the cache line by the self-processor, for every unit of predetermined data width, and a speculation load flag indicating presence or absence of reading out the speculative data by the self-processor to the cache line, for every unit of predetermined data width, and the cache control unit performs processing of maintaining consistency of data of the cache memory, at input and output time of a bus request concerned with read and write, based on cache line states of the other cache memories obtained by exchanging the cache line states including the effective flag, the update flag, the share flag, the speculation flag, the update objective flag, the update effective flag, and the store flag, the cache line state of the self-cache memory, and the execution sequence of a thread executed by the self-processor and the threads executed by the other processors.

According to another aspect of the invention, a multiprocessor system, formed by a plurality of processors respectively having inherent cache memories and cache control units and sharing a main memory, the cache control units being connected with each other by a bus and the respective cache control units and the main memory being connected with each other by a bus, for executing a plurality of threads whose execution sequence is defined, in which the cache control unit writes data into a cache memory inherent to a thread executing processor when the thread executing processor writes data; updates the cache memory when there is a cache line corresponding to a writing target address of the data, in a cache memory inherent to a processor executing a thread positioned posterior to the above thread in the execution sequence; and records that the thread executing processor has written data into the cache line when there is a cache line corresponding to the writing target address of the data, in a cache memory inherent to a processor executing a thread prior to the above thread in the execution sequence.

In the preferred construction, in every cache line of the cache memory, provided are an effective flag indicating whether the cache line is effective or invalid, an update flag indicating whether the cache line disagrees with the main memory, a share flag indicating whether the cache line is shared with which processor, a speculation flag indicating whether the cache line includes speculative data and specifying a processor that is the cause of the speculative data when it includes, an update objective flag for storing into the cache line to the effect that a processor has written data, for every processor executing a thread positioned posterior in the execution sequence, an update effective flag indicating that when one of the update objective flags is set, the cache line has been updated by a processor corresponding to the set update objective flag and it may be invalid, a store flag indicating presence or absence of writing into the cache line by the self-processor, for every unit of predetermined data width, and a speculation load flag indicating presence or absence of reading out the speculative data by the self-processor to the cache line, for every unit of predetermined data width, and the cache control unit properly updates a cache line state of the self-cache memory, at input and output time of a bus request concerned with read and write, based on the cache line states of the other cache memories obtained by exchanging the cache line states including the effective flag, the update flag, the share flag, the speculation flag, the update objective flag, the update effective flag, and the store flag, the cache line state of the self-cache memory, and the execution sequence of a thread executed by the self-processor and the threads executed by the other processors, when a thread executing processor updates a cache memory inherent to the processor, if the data of the same address exists in a cache memory inherent to a processor executing a thread posterior in the execution sequence, the cache control unit simultaneously updates the cache memory, but if the data of the same address exists in a cache memory inherent to a processor executing a precedent thread in the execution sequence, it doesn't rewrite the cache memory but stores to the effect that it has been rewritten, into the update objective flag, and when a processor finishes a thread, the update effective flag is set in all the cache lines or a cache line with one of the update objective flags set there, a cache line with the update effective flag set and with one of the update objective flags set may be invalid, and a cache line with the update effective flag reset or with all the update objective flags reset may be effective, and whether a cache line which may be invalid is actually invalid or effective is examined during the execution of the next thread.

In another preferred construction, the cache control unit decides a possibility of updating a target cache line of update processing and an update target data portion, with reference to content of the store flag of a cache line in a target cache memory of the update processing and content of the store flag of a cache line existing in a cache memory inherent to a processor executing a thread positioned in the execution sequence between the above thread and a thread executed by a processor having a target cache memory of the update processing.

In another preferred construction, when a thread executing processor gains access to a cache line in a cache memory inherent to the self-processor, hence to find that the update objective flag and the update effective flag are both effective, the cache control unit determines whether the cache line is effective or invalid, referring to whether or not there is a cache line of a writing target address, in the cache memory inherent to the above processor having written the data, which is proved by the update objective flag, and when it is invalid, transfers effective data from a cache memory inherent to the other processor or a main memory, to this cache line to store the effective data therein.

In another preferred construction, when the other processor gains access to a cache line in a cache memory inherent to a thread executing processor, hence to find that the update objective flag and the update effective flag are both effective, the cache control unit determines whether the cache line is effective or invalid, referring to whether or not there is a cache line of the writing target address, in a cache memory inherent to the above processor having written the data, which is proved by the update objective flag, and when it is invalid, invalidates this cache line.

In another preferred construction, when a processor executing a thread positioned posterior in program sequence writes data, a buffer for storing the writing target address and the write data is provided, and upon completion of execution of a thread, when there is a cache line corresponding to the address stored in the buffer, the cache control unit writes data of the address stored in the buffer, into the cache line.

In another preferred construction, the cache control unit specifies a data sharing processor, with reference to the share flag, when supplying a bus request, and supplies the bus request only to the data sharing processor.

In another preferred construction, when the execution of a thread is canceled in a processor and further canceled also in the other processor that is the cause of a speculative cache line, of the speculative cache lines existing in the cache memory inherent to the processor, the cache control unit invalidates this cache line.

According to the present invention, an update flag indicating which processor updated is provided to a cache line forming a cache memory, when gaining access to the cache memory, whether the cache line is effective or not is determined, referring to the update flag and, if necessary, the state of the cache line held by the other cache memories. When some processor executes a store instruction, the store data of the store instruction is stored in the cache memory inherent to the same processor, and moreover, when there exists a cache line of the same address as that of the store instruction in a cache memory inherent to a processor executing a thread positioned posterior in the program sequence to a thread executed by the processor, an effective data portion is calculated and only the effective data portion is updated, with reference to all the cache lines holding the data of the same address. While, when there exists a cache line of the same address as that of the store instruction in a cache memory inherent to a processor executing a thread positioned prior in the program sequence to a thread executed by the processor, the update flag corresponding to the processor having executed the store instruction is set. Further, the execution of the thread is finished and when the data created by the thread is determined, the effect of the update flag is turned effective.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENTS

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 1:
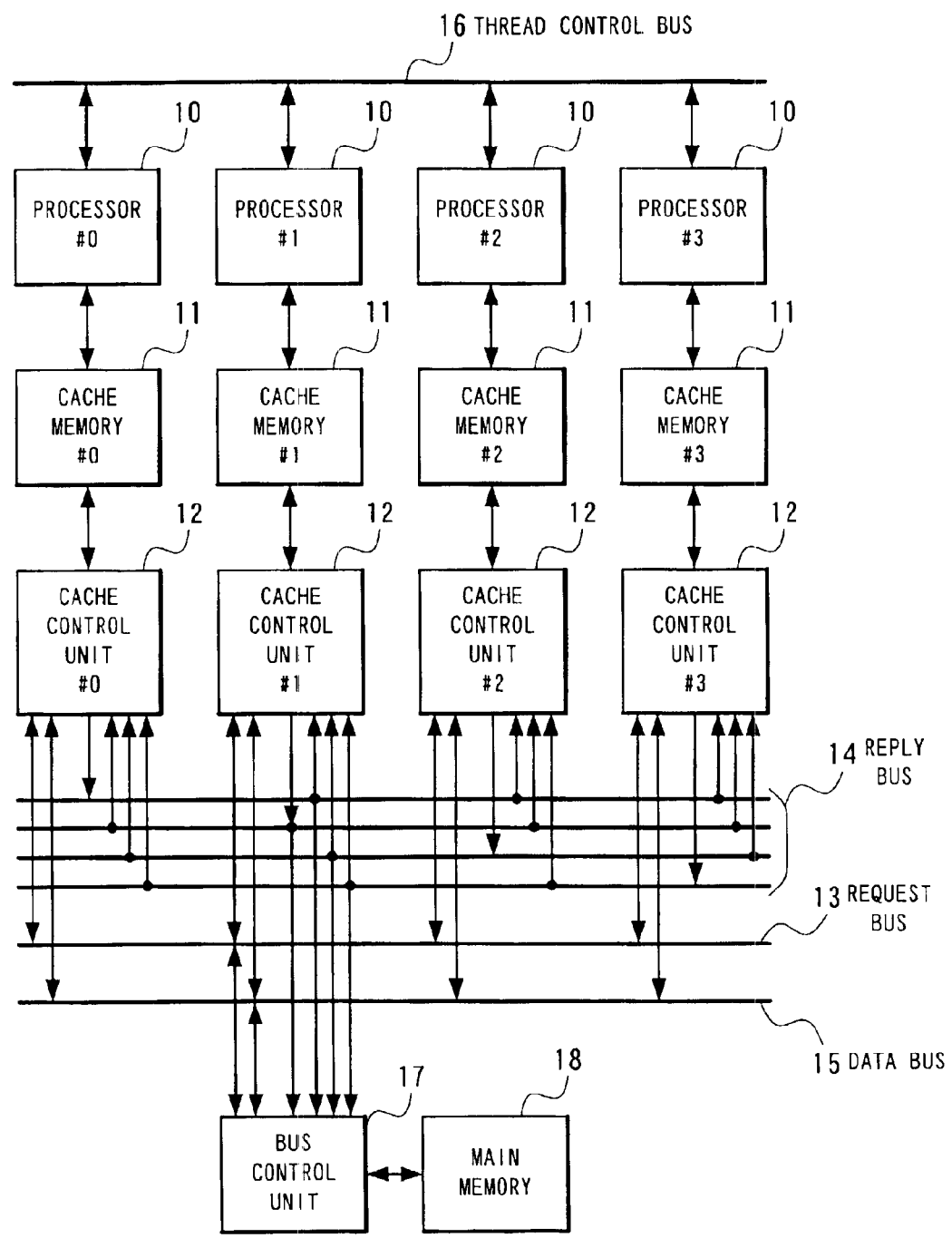
FIG. 1 is a block diagram showing the structure of a multiprocessor system including cache memories according to the present invention.

FIG. 1 is a block diagram showing the structure of a multiprocessor system including cache memories according to the present embodiment. With reference to FIG. 1, the multiprocessor system according to this embodiment comprises four processors #0 to #3 (reference numeral 10), four cache memories #0 to #3 (reference numeral 11), four cache control units #0 to #3 (reference numeral 12), a request bus (reference numeral 13), a reply bus (reference numeral 14), a data bus (reference numeral 15), a thread control bus (reference numeral 16), a bus control unit (reference number 17), and a main memory (reference numeral 18).

The processor #0 is connected to the cache memory #0 and the cache control unit #0; the processor #1 is connected to the cache memory #1 and the cache control unit #1; the processor #2 is connected to the cache memory #2 and the cache control unit #2; the processor #3 is connected to the cache memory #3 and the cache control unit #3, hence to execute threads in parallel. The respective processors #0 to #3 are connected with each other through the thread control bus 16, so to transfer the control information about thread execution such as creation of a thread, finish and cancel of the thread execution, and the sequence of threads.

The respective processors #0 to #3 can know the sequential relation between a thread executed by the self-processor and the threads executed by the other processors, with reference to the thread control information transferred through the thread control bus 16. The respective cache control units #0 to #3 control the transfer of the memory data that is a target of the memory access instruction, toward the other processors and the main memory, through the request bus 13, the reply bus 14, and the data bus 15. At this time, with reference to the sequential relationship of the threads notified by the processor, a consistency among the memory data is expected to be maintained, considering a flow dependence, an anti-dependence, and an output dependence on the memory. Each of the request bus 13, the reply bus 14, and the data bus 15 may be shared among the respective processors, or the individual buses for the number of the processors may be provided. In the below, the request bus 13, the reply bus 14, and the data bus 15 are collectively referred to simply as a bus.

Figure 2:
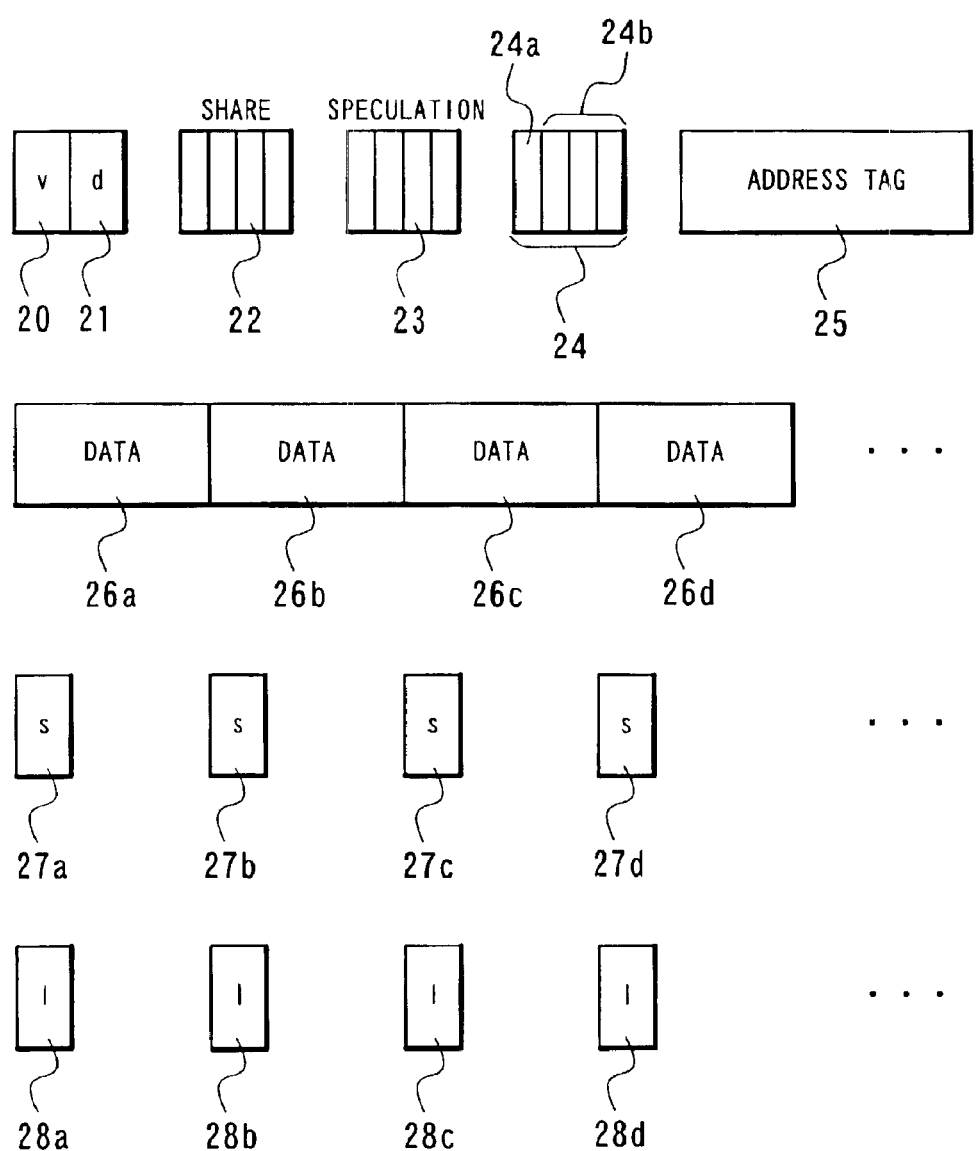
FIG. 2 is a view for use in describing the details of a first embodiment of a cache line forming the cache memory.

FIG. 2 is a view for use in describing the detail of the cache line forming the cache memory 11. One cache line holds data within the range of the address indicated by an address tag 25. With reference to FIG. 2, the cache line forming a cache memory comprises an effective flag (reference numeral 20), a change flag (reference numeral 21), a share flag (reference numeral 22), a speculation flag (reference numeral 23), an update flag (reference numeral 24), an address tag (reference numeral 25), a plurality of data entries (reference numeral 26), a plurality of store flags (reference numeral 27), and a plurality of speculation load flags (reference numeral 28).

The effective flag 20 indicates that this cache line is effective. The effective flag 20 is set when transferring data to the cache memory and creating (refilling) the cache line in case of a cache miss, while the effective flag 20 is reset when invalidating the cache line in case of replacing the cache line.

The change flag 21 indicates that the data of this cache line has been changed by a store instruction and that it is different from the data within the main memory. The change flag 21 is set when writing data into the cache line, like a store instruction and reset when writing back the data of the cache line to the main memory.

The share flag 22 indicates that the data is shared with the other processor whose inherent cache line has the same address as that of this cache line. The share flag according to this embodiment characteristically includes the same number of flags as the number of the processors provided in a multiprocessor system. Specifically, the respective flag portions correspond to the respective processors, and when a flag is set, it means that the data is shared with the processor corresponding to the flag; while when a flag is reset, it means that the data is not shared with the processor corresponding to the flag.

Accordingly, by referring to the share flag 22, it is possible to specify a processor to share the data with. The share flag 22 is set or reset when having access to a bus. More specifically, when some processor gains access to a bus through the cache control unit 12, the states of the cache lines of all the cache memories 11 are notified to the cache control units 12 of all the processors through the reply bus 14. At this time, since it turns out that the above processor shares the data with which processor, a flag corresponding to the processor with which the data is shared, is set and a flag corresponding to the processor with which the data is not shared is reset, of the flags forming the share flag 22.

The speculative flag 23 indicates that the data of this cache line includes speculative data. The speculative flag according to this embodiment characteristically includes the same number of flags as the number of the processors provided in a multiprocessor system. More specifically, the respective flag portions correspond to the respective processors, and when a flag is set, the processor corresponding to the flag is the cause of the speculative data. Accordingly, by referring to the speculative flag 23, it is possible to specify a processor which causes the data of the cache line to be speculative. When getting refill data from a speculative cache line held by the cache memory of the other processor, in refilling the cache line, a flag corresponding to the above other processor, of the speculative flag 23, is set.

When this cache line is updated with the speculative data, according to a speculative store instruction included in a thread executed by the self-processor (hereinafter, referred to as a self-thread), a flag corresponding to the self-processor, of the speculative flag 23, is set. When the cache line is updated with the speculative data, according to a speculative store instruction included in a preceding thread in program sequence (hereinafter, referred to as a parent thread), a flag portion corresponding to the processor executing the parent thread, of the speculative flag 23, is set. While, the speculation flag 23 is reset when the speculative execution of the self-thread becomes definitive and then the data of the cache line is defined.

The update flag 24 indicates that the data of this cache line has been updated according to a thread positioned posterior in program sequence (hereinafter, referred to as a child thread). Namely, it means that the data of the cache line is effective in the present thread executed by this processor, but that it may not be effective in the next thread assigned to this processor. The update flag 24 consists of an update effective flag 24a of 1 bit and update objective flags 24b of bits for the number of the processors excluding the self-processor provided in the multiprocessor system. The update effective flag 24a indicates that the whole update flag 24 is effective. When finishing a thread, all the update effective flags 24a are set. As another form of embodiment, however, only the update effective flag 24a of the update flag 24, where one of the update objective flag 24b is set, may be set.

When the update effective flag 24a is set and one of the update objective flags 24b is set, this means that the cache line may not be effective in the next executed thread. Whether the cache line is actually effective or not, is examined by the states of the cache lines exchanged by the cache control units at an input and output time of a bus request accompanied at a cache miss, and when it is effective, the update objective flags 24b and the update effective flag 24a are reset. While, when the update effective flag 24a is reset, or when all the update objective flags 24b are reset, this means that the cache line is also effective in the next executed thread. The update objective flags 24b respectively correspond to the other processors and show that the cache line corresponding to the processor is updated.

The data entry 26 holds the memory data of the cache line. Generally, one cache line includes a plurality of data entries forming the address range specified by the address tag 25, and the respective data entries are the minimum data unit of writing by a store instruction. In FIG. 2, the plurality of data entries 26 are respectively described as the data entry 26a, the data entry 26b, the data entry 26c, the data entry 26d, ... in a distinguished way.

The store flag 27 indicates that the self-processor writes data into the corresponding data entry according to a store instruction. In FIG. 2, the store flag 27a corresponds to the data entry 26a, the store flag 27b corresponds to the data entry 26b, the store flag 27c corresponds to the data entry 26c, the store flag 27d corresponds to the data entry 26d, respectively. The store flag is set when the self-processor performs writing and reset when the execution of a thread is finished.

The speculative load flag 28 indicates that the self-processor performs the speculative reading from the corresponding data entry. In FIG. 2, the speculative load flag 28a corresponds to the data entry 26a, the speculative load flag 28b corresponds to the data entry 26b, the speculation load flag 28c corresponds to the data entry 26c, and the speculation load flag 28d corresponds to the data entry 26d. The speculation load flag performs the speculative writing, and it is set when writing is not performed on the data to be read out yet, in other words, when the corresponding store flag 27 is not set. While, it is reset when the speculative execution of a thread becomes definitive.

Figure 3:
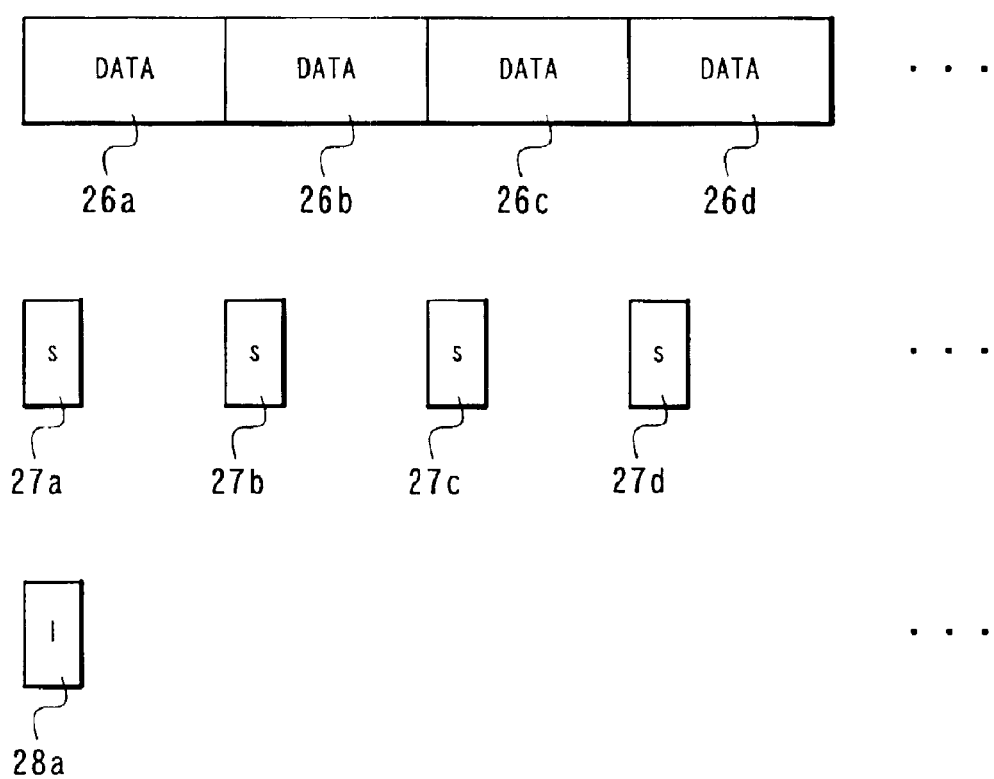
FIG. 3 is a view for use in describing the details of a second embodiment of a cache line forming the cache memory.

In the example of the cache line shown in FIG. 2, the data entries 26a, 26b, . . . , that are the minimum data units of writing, are respectively provided with the individual store flags 27a, 27b, . . . , and the individual speculation load flags 28a, 28b, . . . . However, a plurality of data entries are represented by a single store flag or a single speculation load flag. For example, FIG. 3 is a second embodiment of a cache line provided with one speculation load flag 28a for the four data entries 26a, 26b, 26c, and 26d. The components other than the data entry 26, the store flag 27, and the speculation load flag 28 are omitted. The speculation load flag 28a indicates that the speculative writing is performed on one of the four data entries 26a, 26b, 26c, and 26d. In this case, compared with the case of providing the respective data entries with the respective inherent speculation load flags, it is effective in reducing the hardware amount necessary for installation of a cache memory.

Figure 4:
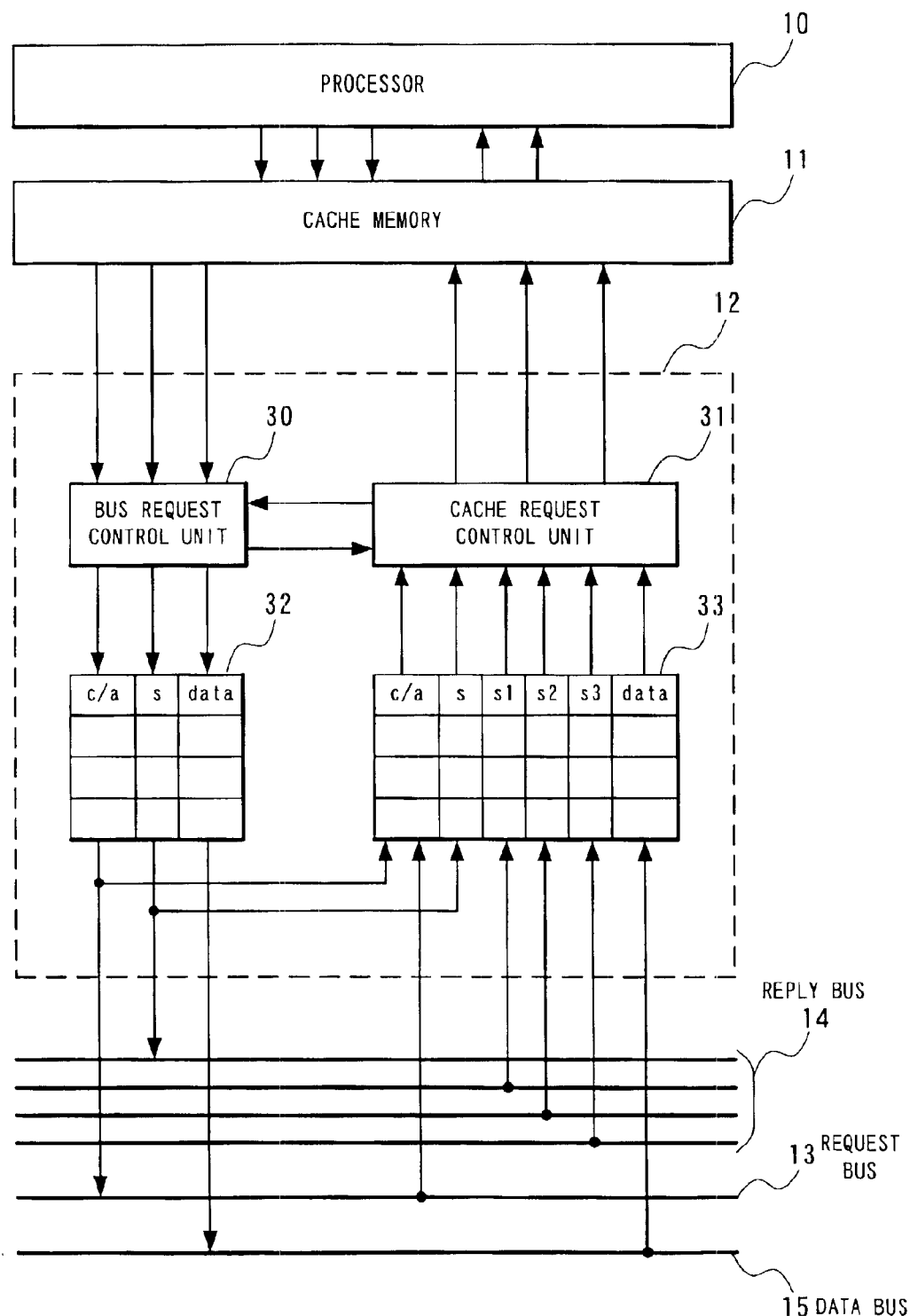
FIG. 4 is a block diagram showing the details of the first embodiment of a cache control unit.

FIG. 4 is a block diagram showing the detail of the first embodiment of the cache control unit 12. With reference to FIG. 4, the cache control unit 12 comprises at least a bus request control unit (reference numeral 30), a cache request control unit (reference numeral 31), a bus request output buffer (reference numeral 32), and a bus request input buffer (reference numeral 33).

Upon receipt of a notice of a cache miss, a store notice, and the relevant address, the store data, and the state of the cache line from the cache memory 11, the bus request control unit 30 creates a bus request referring to the above and registers it into the bus request output buffer 32. Here, the state of the cache line becomes the cache line including the effective flag 20, the change flag 21, the share flag 22, the speculation flag 23, the update flag 24, and the store flag 27 as shown in FIG. 2, and in case of a cache miss, the bus request control unit 30 indicates the state of the target cache line of the refilling processing caused by the miss, while in case of a cache hit, it indicates the state of the hit cache line.

The bus request output buffer 32 stores a bus request created by the bus request control unit 30 and supplies it to the other processor and the main memory through the buses sequentially. More specifically, the bus request is formed by command, address, cache line state, and data. The command and the address are supplied to the request bus 13, the cache line state is supplied to the reply bus 14, and the data is supplied to the data bus 15. The bus request output buffer 32 simultaneously transfers the command and the address supplied to the request bus 13 and the cache line state supplied to the reply bus 14, also to the bus request input buffer 33. This embodiment characteristically supplies a bus request only to a data-sharing processor, referring to the share flag 22 included in the cache line state, when supplying the bus request. Namely, in a processor with which the data is not shared, access to the cache memory by the bus request doesn't occur and performance deterioration caused by access competition of the cache memory is small, and further the power consumption in the cache memory can be reduced.

The bus request input buffer 33 stores the command and the address of the bus request transferred through the request bus 13, the cache line state transferred through the reply bus 14, and the data transferred through the data bus 15, from the other processors and the main memory. The bus request input buffer 33 also stores the command and the address of a bus request supplied to the request bus 13 and the cache line state supplied to the reply bus 14, from the bus request output buffer 32, and waiting for the cache line state to arrive here, which the other processor supplies to the reply bus 14 in reply to the bus request, it stores the same. Simultaneously, the bus request input buffer 33 sequentially supplies the stored bus requests entered from the buses, more specifically, the command, the address, the cache line state, and the data sequentially to the cache request control unit 31.

The cache request control unit 31 sequentially interprets the bus requests which are sequentially entered and held by the bus request input buffer 33. As for a bus request supplied from the other processor through the buses, the cache request control unit 31 determines whether or not the cache memory 11 holds the target cache line of the bus request, through access to the cache memory 11; when it doesn't hold, this effect is supplied to the reply bus 14 through the bus request control unit 30 and the bus request output buffer 32, and when it holds, the state of the cache line is supplied there in the same way. At the same time, the cache line state of the own cache memory is stored in the corresponding entry of the bus request input buffer 33. When all the replies of the cache line states from the other processors, including the cache line state of the self-processor, arrive at the bus request input buffer 33, the cache request control unit 31 determines the next state of the cache line, with reference to the command of the bus request, the cache line state of the self-processor, and all the cache line states of the other processors, and updates the target cache line.

While, as for a bus request supplied from the self-processor, since the command, address, and cache line state are stored in the bus request input buffer 33, when all the replies of the cache line states from the other processors arrive at the bus request input buffer 33, the cache request control unit 31 determines the next state of the cache line with reference to the command of the bus request, the cache line state of the self-processor, and all the cache line states of the other processors, and updates the target cache line.

Figure 5:
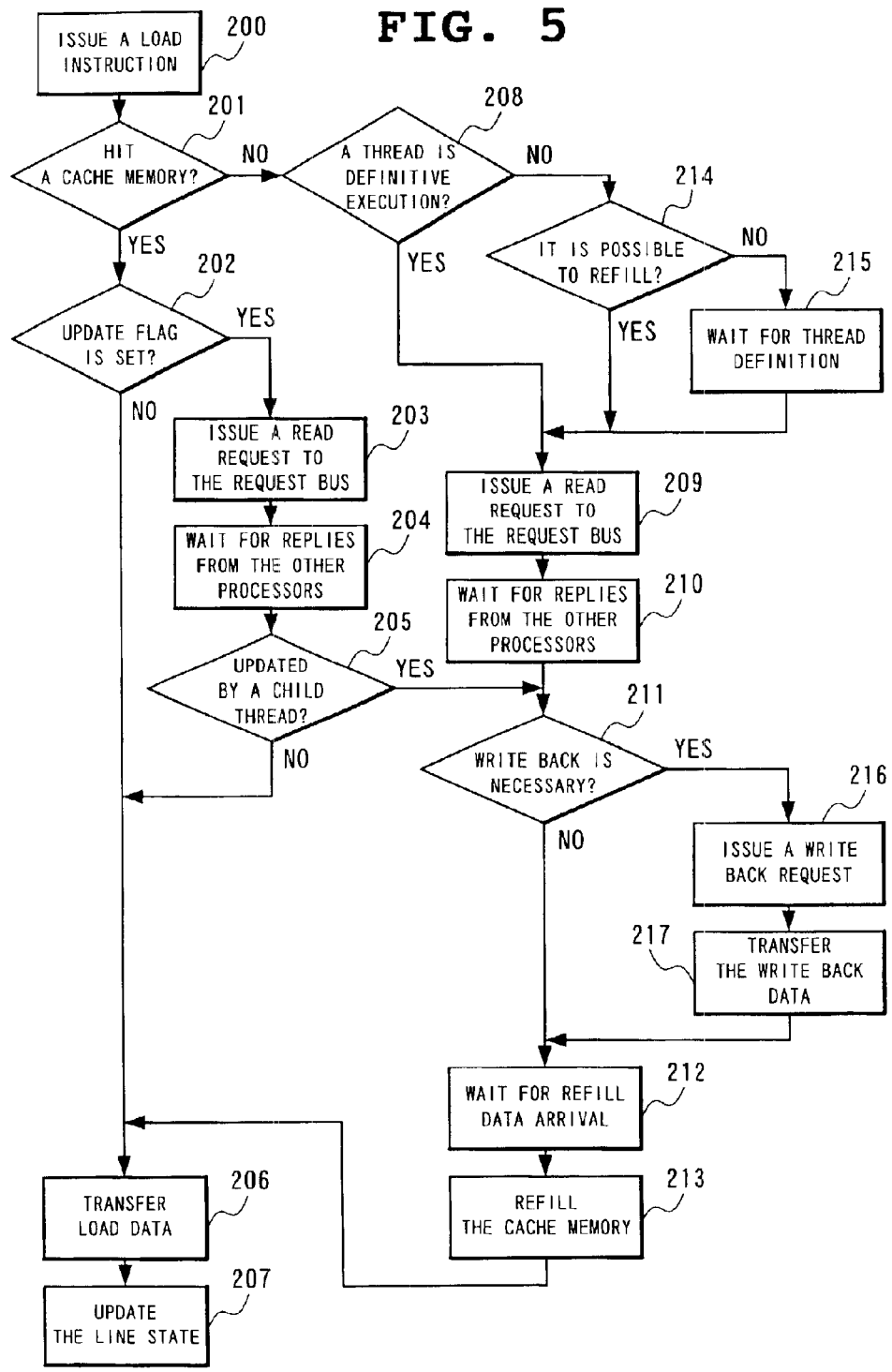
FIG. 5 is a flow chart showing the operation of the cache memory and the cache control unit when a load instruction is issued.

With reference to the flow chart, the detailed operations of the cache memory 11 and the cache control unit 12 will be described. FIG. 5 is a flow chart showing the operations of the cache memory 11 and the cache control unit 12 when a load instruction is issued. When a load instruction is issued from a processor 10 (Step 200 in FIG. 5), access is obtained to the cache memory 11, and whether the load instruction hits or misses the cache memory is checked (Step 201 in FIG. 5). When it hits the cache memory, the hit cache line is read out and the update flag 24 within the cache line is referred to (Step 202 in FIG. 5). When the update flag 24 is not set, namely when the update effective flag 24*a* is not set or none of the update objective flags 24*b* are set, this cache line has not been updated by a child thread and it is judged to be effective.

In this case, the data to be loaded is transferred from the cache memory 11 to the processor 10 (Step 206 in FIG. 5). When the load instruction is a speculative execution on a flow dependence between threads, the speculation load flag 28 corresponding to the data entry 26 storing the data to be loaded is set (Step 207 in FIG. 5), and the execution of the load instruction is finished. Whether the issued load instruction is speculative or definitive is notified to the cache memory 11 from the processor 10.

While, when the update flag 24 is set, with reference to the update flag 24 (Step 202 in FIG. 5), namely when the update effective flag 24*a* is set and one of the update objective flags 24*b* is set, it means that this cache line has been updated by a child thread and that this cache line may be already invalid. The reason why the cache line cannot be judged to be invalid definitively is that the update by a child thread is speculative and that actually the cache line may be effective in the case where it has been canceled.

In order to make a definitive judgment, it is necessary to refer to the cache line state of the cache memory of the processor that has executed the child thread. Then, the bus request control unit 30 creates a read request for referring to the cache memory of the other processor and issues the read request to the request bus 13 through the bus request output buffer 32 (Step 203 in FIG. 5). Simultaneously, the read request, the target address of the read request, and the cache line state of the self-processor are stored in the bus request input buffer 33, and the processor 10 waits for the cache line states, that are replies to the read request, to arrive here through the reply bus 14 from the cache control units of the other processors (Step 204 in FIG. 5).

When the replies to the read request from all the processors arrive here, whether the cache line of the own self is actually invalid or effective is determined (Step 205 in FIG. 5). More specifically, referring to the cache line state of a processor corresponding to the set update objective flag 24*b*, in case of hitting the cache line, it is determined that the cache line has been actually updated by the processor. While, in case of missing the cache lines in any processor, as for all the update object flags 24*b* being set, the update has been cancelled by the failure of the speculative execution and it is determined that the cache line has not been actually updated.

When it has not been updated actually, since the cache line is effective, the reading processing can be executed at once. In this case, the refilling processing is not necessary, and the processing in reply to the read request is not performed in the processor that has received the read request previously issued. In the reading processing, the data to be loaded is transferred from the cache memory 11 to the processor 10 (Step 206 in FIG. 5). Next, the cache line state is updated and the execution of the load instruction is finished (Step 207 in FIG. 5). More concretely, the update flag 24 is reset and when the load instruction is a speculative execution, the speculation load flag 28 corresponding to the data entry 26 having the data to be loaded stored there is set.

While, when it has been actually updated, since the cache line is invalid, it is necessary to refill the effective data from the cache memory of the other processor or the main memory. A necessity of writing back the data of the cache line is judged (Step 211 in FIG. 5) before the refilling processing. Though the cache line is invalid to the thread which this processor is currently executing, it is effective to the parent thread in some cases.

More specifically, when there is not a definite cache line, namely when there is not a cache line with no speculation flag 23 set there, in the cache memory of the processor which updated this cache line, since this cache line holds the only definitive data, it is judged that write back is necessary. While, when there is a definite cache line in the cache memory of the processor of the update source of this cache line, it is judged that write back is not necessary.

When it is judged that the write back is necessary, the bus request control unit 30 creates a write back request, supplies it to the request bus 13 through the bus request output buffer 32 (Step 216 in FIG. 5), and supplies the data to be written back to the data bus 15 (Step 217 in FIG. 5). Then, the processor 10 waits for the refill data to arrive, which is transferred from the other cache memory or the main memory through the data bus 15 (Step 212 in FIG. 5) to the previously issued read request. The cache request control unit 31 refills the cache memory 11 with the arrived refill data (Step 213 in FIG. 5), transfers the data to be loaded from the cache memory 11 to the processor 10 (Step 206 in FIG. 5), and updates the cache line state, hence to finish the execution of the load instruction (Step 207 in FIG. 5).

While it is judged that the write back is not necessary in Step 211 of FIG. 5, it waits for the refill data to arrive (Step 212 in FIG. 5), and then refills the cache memory 11 with the above data (Step 213 in FIG. 5). Next, the cache request control unit 31 transfers the data to be loaded from the cache memory 11 to the processor 10 (Step 206 in FIG. 5), and updates the cache line state, hence to finish the execution of the load instruction (Step 207 in FIG. 5).

As mentioned above, in Step 201 of FIG. 5, the operation when the load instruction hits the cache memory has been described. While, when the load instruction misses the cache memory, the operation differs depending on whether the thread execution is definitive or speculative (Step 208 in FIG. 5). When the thread execution is speculative, namely when the issued load instruction is speculative, it is checked whether it is possible to refill the cache memory 11 (Step 214 in FIG. 5). When there is no space in the candidate entries of the refilling destination in the cache memory 11 and when one of the store flags 27 and the speculation flag 23 are set in all the cache lines stored in the entries, or when one of the speculation load flags 28 is set, it is impossible to refill the cache line 11. In this case, after waiting for the thread to become definitive (Step 215 in FIG. 5), the processor 10 starts the refilling processing from Step 209 in FIG. 5.

While, when there is at least one space in the candidate entries of the refilling destination in the cache memory 11, it is possible to refill the cache memory 11. Even if there is no space, when no speculation flag 23 or none of the store flags 27 are set in one cache line stored in the candidate entries of the refilling destination and when none of the speculation load flags 28 is set, it is possible to refill the entry. In this case, the refilling processing starts from Step 209 in FIG. 5.

While, when the thread execution is definitive, namely, when the issued load instruction is definitive (Yes in Step 208 in FIG. 5), since refilling is always possible, the refilling processing starts from Step 209 in FIG. 5. Concretely, a read request is issued to the request bus 13 (Step 209 in FIG. 5), and replies to it from the other processors are waited (Step 210 in FIG. 5).

Whether the write back is necessary or not is checked (Step 211 in FIG. 5). When there is a cache line changed by a store instruction, namely a cache line having the change flag 21 set, in the entry of the refilling destination, the write back is necessary. In this case, a write back request is issued to the request bus 13 (Step 216 in FIG. 5), and the data to be written back is supplied to the data bus 15 (Step 217 in FIG. 5). Then, it waits for the refill data to arrive (Step 212 in FIG. 5), and refills the cache memory 11 with the above data (Step 213 in FIG. 5). It transfers the data to be loaded from the cache memory 11 to the processor 10 (Step 206 in FIG. 5), and updates the cache line state, hence to finish the execution of the load instruction (Step 207 in FIG. 5).

When the write back is not necessary, the unit 12 waits for the refill data to arrive (Step 212 in FIG. 5), and refills the cache memory 11 (Step 213 in FIG. 5). It transfers the data to be loaded from the cache memory 11 to the processor 10 (Step 206 in FIG. 5), and updates the cache line state, hence to finish the execution of the load instruction (Step 207 in FIG. 5).

Figure 6:
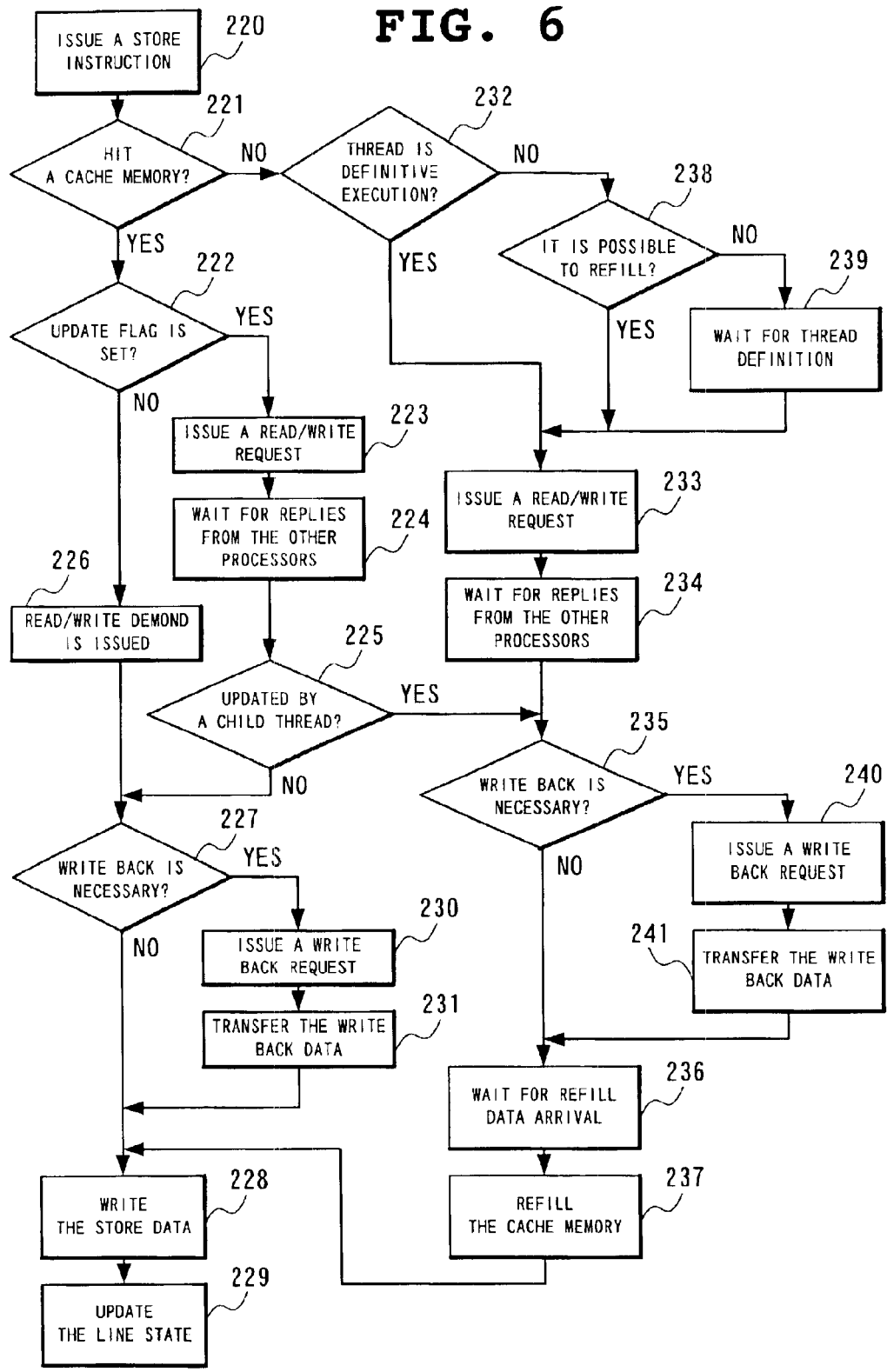
FIG. 6 is a flow chart showing the operation of the cache memory and the cache control unit when a store instruction is issued.

As mentioned above, the operation of the cache memory 11 and the cache control unit 12 has been described in the case where a load instruction is issued. With reference to FIG. 6, the operation of the cache memory 11 and the cache control unit 12 when a store instruction is issued will be described.

When the processor 10 issues a store instruction (Step 220 in FIG. 6), access is obtained to the cache memory 11, and whether or not the store instruction hits the cache memory is checked (Step 221 in FIG. 6). When it hits the cache memory, the hit cache line is read out and the update flag 24 within the cache line is referred to (Step 222 in FIG. 6).

When the update flag 24 is not set, namely when the update effective flag 24a is not set, or none of the update objective flags 24b is set, it means that the cache line is not updated by a child thread and that the cache line is effective. In this case, the bus request control unit 30 creates a write request and supplies the write request to the request but 13 through the bus request output buffer 32 (Step 226 in FIG. 6). The write request is a bus request for notifying the execution of the store instruction and its store data to the other processor and the cache memory, and requesting the corresponding processing.

Before the writing by the store instruction, whether the write back of the previous data to the main memory is necessary or not is checked (Step 227 in FIG. 6). When the cache line the store instruction hits is definitive, namely when the speculation flag 23 is not set and the store instruction is a speculative execution, the definitive data is written back into the main memory before writing the speculative data. More specifically, a write back request is issued to the request bus 13 (Step 230 in FIG. 6), and the data to be written back is transferred through the data bus 15 (Step 231 in FIG. 6).

Thereafter, the store data is written into the data entry 26 of the writing target cache line of the store instruction (Step 228 in FIG. 6). The cache line state is updated and the execution of the store instruction is finished (Step 229 in FIG. 6). More concretely, the change flag 21 and the store flag 27 corresponding to the data entry storing the data to be stored are set. Further, when the store instruction is a speculative execution, the flag portion corresponding to the self-processor, of the speculation flags 23, is set.

While, when the write back is not necessary (No in Step 227 in FIG. 6), the store data is written into the data entry of the writing target cache line of the store instruction as it is (Step 228 in FIG. 6). Then, the cache line state is updated and the execution of the store instruction is finished (Step 229 in FIG. 6).

While, in the reference to the update flag (Step 222 in FIG. 6), when the update flag 24 is set, namely when the update effective flag 24a is set and one of the update objective flags 24b is set, it means that the cache line is updated by a child thread and that the cache line may be already invalid. In this case, the bus request control unit 30 creates a read/write request and issues the read/write request to the request bus 13 (Step 223 in FIG. 6). The read/write request is a bus request for requesting the processing corresponding to the write request, after the-processing toward the read request, at a target address to be supplied simultaneously to the request bus.

This cache control unit 12 waits for replies to the read/write request to arrive from the other cache control units (Step 224 in FIG. 6), and referring to the replies, it checks whether or not the cache line has been actually updated by a child thread (Step 225 in FIG. 6). When the cache line has not been actually updated, since the cache line is effective, it can start the write processing at once. In this case, the refilling processing is not necessary, and the processor having received the previously issued read/write request will not perform the processing on the read request portion. In the write processing, at first, whether the write back is necessary or not is checked (Step 227 in FIG. 6).

When the write back is necessary, the write back request is issued (Step 230 in FIG. 6) and the transfer of the write back data is performed (Step 231 in FIG. 6). Then, the store data is written into the data entry of the writing target cache line of the store instruction (Step 228 in FIG. 6). The cache line state is updated and the execution of the store instruction is finished (Step 229 in FIG. 6).

In the check of presence of the update by a child thread in Step 225 of FIG. 6, when the cache line has been actually updated, since the cache line is invalid, it is necessary to refill the cache line with the effective data from the cache memory of the other processor or the main memory, in the same way as in the case of the load instruction. Before the refilling processing, a necessity of writing back the data of the cache line is checked (Step 235 in FIG. 6).

Although the cache line is invalid to the thread which the self-processor is currently executing, it is effective to the parent thread in some cases. More specifically, when there is not a definitive cache line, or a cache line having no speculation flag 23 set, in the cache lines of the processor which has updated this cache line, since this cache line holds the only definitive data, it is judged that the write back is necessary. While, when there is a definitive cache line in the cache lines of the processor that is the update source of this cache line, it is judged that the write back is not necessary.

When it is determined that the write back is necessary, a write back request is issued (Step 240 in FIG. 6) and the transfer of the write back data is performed (Step 241 in FIG. 6). Then, the cache control unit waits for the refill data transferred from the other cache memory or the main memory through the data bus 15 to arrive here in reply to the previously issued read/write request (Step 236 in FIG. 6). The cache request control unit 31 refills the cache memory 11 with the arrived refill data (Step 237 in FIG. 6). Then, the store data is written into the data entry of the writing target cache line of the store instruction (Step 228 in FIG. 6). The cache line state is updated and the execution of the store instruction is finished (Step 229 in FIG. 6).

When it is judged that the write back is not necessary, the cache control unit waits for the refill data to arrive here (Step 236 in FIG. 6), and refills the cache memory 11 with the arrived refill data (Step 237 in FIG. 6). Then, the store data of the store instruction is written into the data entry (Step 228 in FIG. 6), and the cache line state is updated, hence to finish the execution of the store instruction (Step 229 in FIG. 6).

As mentioned above, in Step 221 of FIG. 6, the operation when a store instruction hits a cache memory has been described. While, when a store instruction misses the cache memory, the operation differs depending on whether the thread execution is definitive or speculative, in the same way as in the case of the load instruction (Step 232 in FIG. 6). When the thread execution is speculative, namely when the issued store instruction is speculative, whether or not it is possible to refill the cache memory is checked (Step 238 in FIG. 6). When there is no space in the candidate entries of the refilling destination of the cache memory 11, and when the speculation flag 23 and one of the store flags 27 of all the cache lines stored in the entries are set or one of the speculation load flags 28 of all the cache lines stored in the entries is set, it is impossible to refill. In this case, after waiting for the thread to become definitive (Step 239 in FIG. 6), the processor starts the refilling processing.

When there is at least one space in the candidate entries of the refilling destination in the cache memory 11, it is possible to refill. Even if there is no space, when the speculation flag 23 or one of the store flags 27 of any cache line stored in the candidate entries of the refilling destination is not set and when none of the speculation load flags 28 is set, it is possible to refill the entry. In this case, the processor starts the refilling processing as it is.

When the thread execution is definitive, namely when the issued store instruction is definitive (Yes in Step 232 of FIG. 6), it is always possible to refill and therefore it starts the refilling processing as it is. Concretely, the processor issues a read/write request to the request bus 13 (Step 233 in FIG. 6), and waits for replies to it from the other processors (Step 234 in FIG. 6).

Whether the write back is necessary or not is checked (Step 235 in FIG. 6). When there is a changed cache line or a cache line having the change flag 21 set, in the entries of the refilling destination, it is determined that the write back is necessary. When it is determined that the write back is necessary, it continues the refilling processing after issuing a write back request (Step 240 in FIG. 6) and transferring the write back data (Step 241 in FIG. 6). While when it is determined that the write back is not necessary, it continues the refilling processing at once. In the refilling processing, it waits for the refill data transferred from the other cache memory or the main memory through the data bus 15 to arrive here (Step 236 in FIG. 6), in reply to the previously issued read/write request. Then, the cache request control unit 31 refills the cache memory 11 with the arrived refill data (Step 237 in FIG. 6). The store data is written into the data entry of the writing target cache line of the store instruction (Step 228 in FIG. 6). Then, the cache line state is updated and the execution of the store instruction is finished (Step 229 in FIG. 6).

Figure 7:
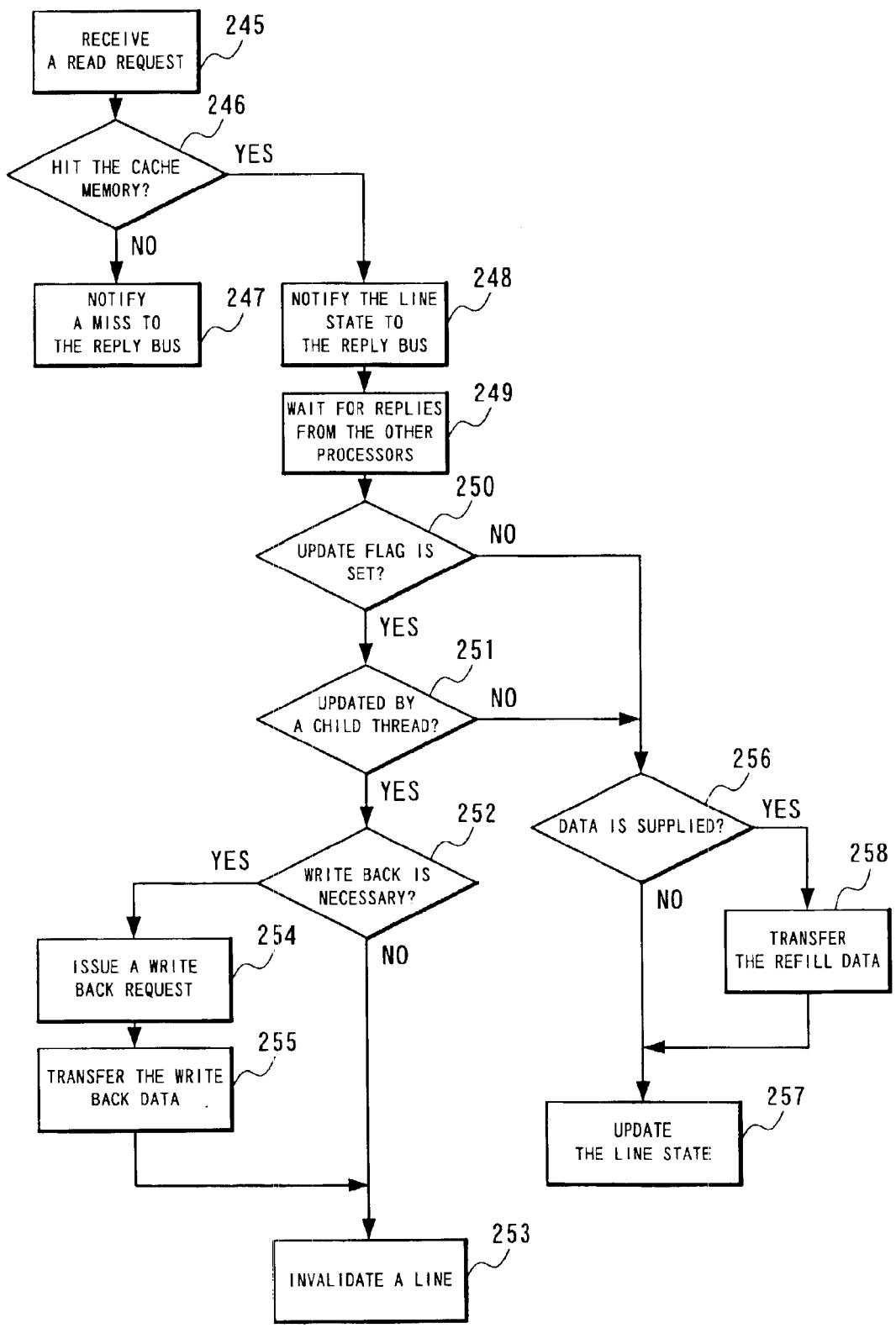
FIG. 7 is a flow chart showing the operation of the cache memory and the cache control unit when a read request is received.

As mentioned above, the operation of the cache memory 11 and the cache control unit 12 when a store instruction is issued is described. With reference to FIG. 7, the operation of the cache memory 11 and the cache control unit 12 when receiving a read request from the other processor through the buses, and when receiving a read/write request, the operation thereof toward the read request portion will be described. When receiving the read/write request, the processing toward the write request described later will be performed after the processing toward the read request. In the following description, the read request or the read request portion of the read/write request is described as a read request simply.

Upon receipt of a read request from the cache control unit 12 of the other processor through the request bus 13, the bus request input buffer 33 stores the command and the address of the read request and the cache line state of the processor which issued this read request, and notifies the cache request control unit 31 of the above (Step 245 in FIG. 7). The cache request control unit 31 interprets the read request, gains access to the cache memory 11, and checks whether the target address of the read request hits the cache memory or not (Step 246 in FIG. 7).

When the read request doesn't hit the cache memory 11, the processor notifies this effect to the other processors through the bus request control unit 30, the bus request output buffer 32, and the reply bus 14 and finishes the processing corresponding to the read request (Step 247 in FIG. 7).

While when the read request hits the cache memory 11, it notifies the state of the hit cache line to the other processors through the bus request control unit 30, the bus request output buffer 32, and the reply bus 14 (Step 248 in FIG. 7), and waits for the cache line state of the other cache memories that are replies from the other processors to arrive here (Step 249 in FIG. 7). Referring to the update flag 24 of the cache line state of the hit cache line, whether or not the update flag 24 is set, is checked (Step 250 in FIG. 7).

When the update flag 24 is not set, namely when the update effective flag 24*a* is not set or none of the update objective flags 24*b* are set, it means that the cache line has not been updated by a child thread and that it may be already effective. In this case, whether or not the data of the own cache line is supplied as the refill data is determined (Step 256 in FIG. 7).

While when the update flag 24 is set, namely when the update effective flag 24*a* is set and one of the update objective flags 24*b* is set, it means that the cache line has been updated by a child thread and that the cache line may be already invalid. In this case, referring to replies of the cache line states from the other processor, whether the own cache line is actually invalid or effective is determined (Step 251 in FIG. 7). More specifically, referring to the cache line state of the processor corresponding to the set update objective flag 24*b*, in case of hit, it is determined that the cache line has been actually updated by the processor. While, in case of miss in any processor, as for all the set update objective flags 24*b*, it is determined that the update is cancelled by the failure of the speculative execution and that the cache line has not been updated actually.

When it has not been actually updated by a child thread, whether or not the data of the own cache line is supplied as the refill data, is checked (Step 256 in FIG. 7). Whether or not the processor that issued the read request actually requires the refilling processing is judged. This is because there is the case where the cache line is actually effective, with no need of refilling processing (No in Step 205 of FIG. 5 and No in Step 225 of FIG. 6) although the processor issued the read request (Step 203 in FIG. 5 and Step 223 in FIG. 6). Even the processor having received the read request can refer to the cache line state of all the cache memories, and therefore it can make a judgment similarly to the processor having issued the read request.

When the processor having issued the read request doesn't need the refilling processing actually, the refill data is not supplied. While, the processor having issued the read request needs the refilling processing actually, it refers to the cache line state of the processor which executes the thread positioned between the thread executed by the self-processor and the thread executed by the processor having issued the read request. Whether the refill data is supplied or not is determined by the cache line state of the thread therebetween and the cache line state of the self-processor. The sequential relationship between threads is notified to the respective cache control units 12 from the self-processor 10.

When there is a speculative cache line (having the speculation flag 23 set) in the cache lines of the intervenient thread, the data of this cache line is invalid as the refill data and the self-processor doesn't supply the refill data.

When, in the cache lines of the intervenient thread, there is not a speculative cache line but a definitive cache line and when the cache line of the self-processor is definitive, the self-processor doesn't supply the refill data from its own cache line.

When, in the cache lines of the intervenient thread, there is not a speculative cache line but a definitive cache line and when the cache line is speculative, the self-processor supplies the refill data from its own cache line.

When the data misses all the cache lines in the processor executing the intervenient thread and there is no effective cache line, this processor supplies the refill data from the own cache line.

When it doesn't supply the refill data, the cache line state is updated, concretely, the update flag 24 is reset, and the processing corresponding to the read request is finished (Step 257 in FIG. 7). While when it supplies the refill data, it transfers the data held by its own cache line to the other processor through the data bus 15 (Step 258 in FIG. 7), and then, updates the cache line state and finishes the processing corresponding to the read request (Step 257 in FIG. 7).

While, in the check of presence of update by a child thread (Step 251 in FIG. 7), when the cache line has been actually updated, since the cache line is already invalid, it is invalidated. First, before the invalidating processing, a necessity of writing back the data of the cache line is judged (Step 252 in FIG. 7). Although the cache line is invalid to the thread that the self-processor is currently executing, it is effective to the parent thread in some cases. More specifically, when there is not a definitive cache line or a cache line having no speculation flag 23 set, in the cache lines of the processor that is the update source of this cache line, since this cache line holds the only definitive data, it is judged that the write back is necessary. While, when there is a definitive cache line in the cache lines of the processor that is the update source of this cache line, it is judged that the write back is not necessary.

When it is judged that the write back is necessary, a write back request is issued to the request bus 13 (Step 254 in FIG. 7), and the data to be written back is supplied to the data bus 15 (Step 255 in FIG. 7). Thereafter, the effective flag 20 of the cache line is reset so to invalidate the cache line, and the processing corresponding to the read request is finished (Step 253 in FIG. 7). While, when it is judged that the write back is not necessary, the effective flag 20 of the cache line is reset at once so to invalidate the cache line and the processing corresponding to the read request is finished (Step 253 in FIG. 7).

As mentioned above, the operation of the cache memory 11 and the cache control unit 12 when receiving a read request and the same operation for the read request portion when receiving a read/write request, from the other processor through a bus, have been described. This time, with reference to FIG. 8, the operation of the cache memory 11 and the cache control unit 12 when receiving a write request and the same operation for the write request portion when receiving a read/write request, from the other processor through a bus, will be described. When receiving a read/write request, the above-mentioned processing for the read request portion is performed and then, the processing for the write request portion is performed. In the following description, a write request and a write request portion of a read/write request is simply described as a write request.

Figure 8:
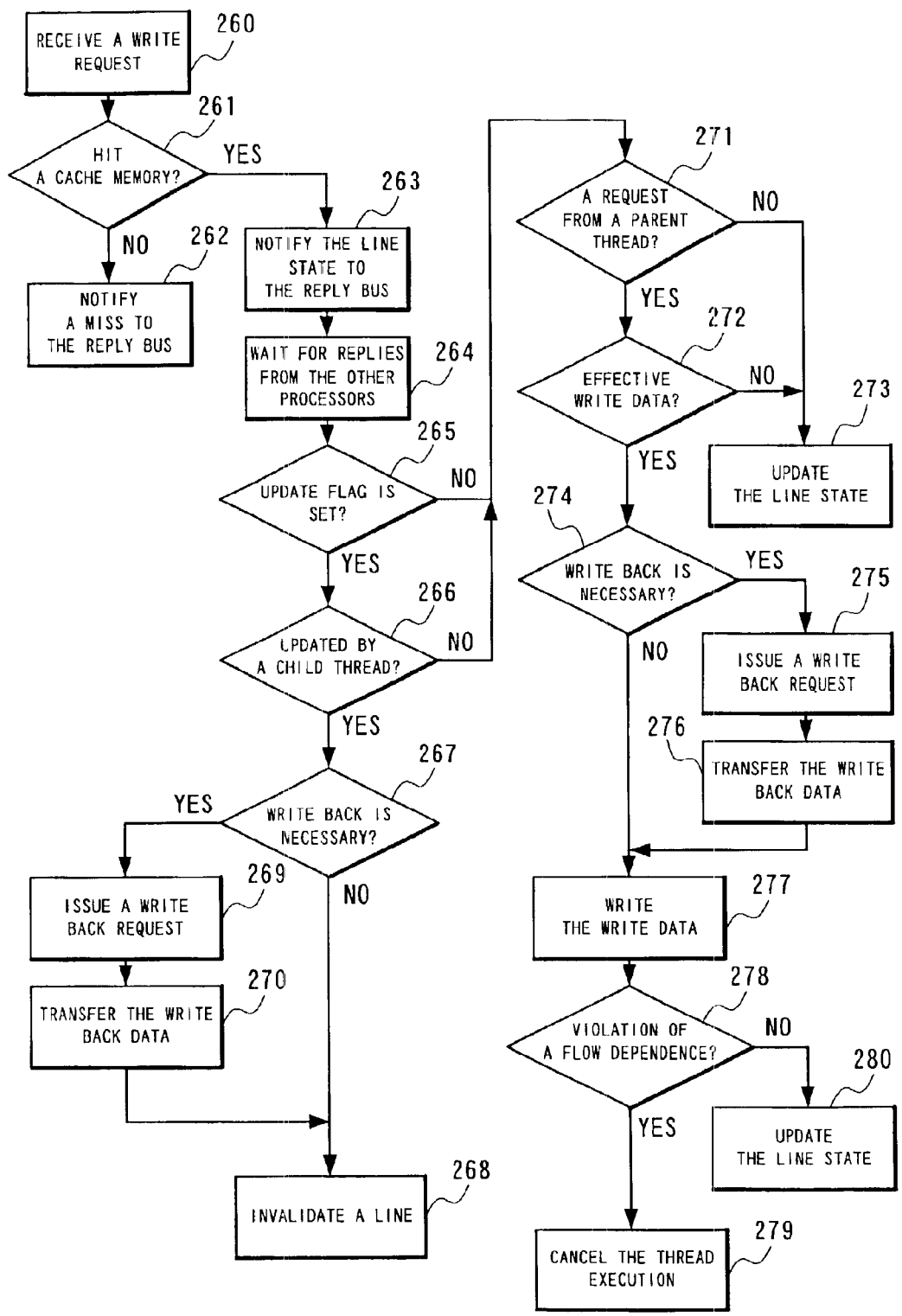
FIG. 8 is a flow chart showing the operation of the cache memory and the cache control unit when a write request is received.

Upon receipt of a write request from the cache control unit 12 of the other processor through the request bus 13, the bus request input buffer 33 stores the command and address of the write request, the cache line state of the processor having issued the write request, and the write data and notifies the cache request control unit 31 of the above (Step 260 in FIG. 8). The cache request control unit 31 interprets the write request, gains access to the cache memory 11, and determines whether the target address of the write request hits the cache memory or not (Step 261 in FIG. 8).

When the write request misses the cache memory 11, the processor notifies this effect to the other processor through the bus request control unit 30, the bus request output buffer 32, and the reply bus 14 and finishes the processing corresponding to the write request (Step 262 in FIG. 8).

While when the write request hits the cache memory 11, the processor notifies the state of the hit cache line to the other processor through the bus request control unit 30, the bus request output buffer 32, and the reply bus 14 (Step 263 in FIG. 8), and waits for the cache line states of the other cache memories that are replies from the other processors to arrive here (Step 264 in FIG. 8). Referring to the update flag 24 of the cache line state of the hit cache line, whether or not the update flag 24 is set is checked (Step 265 in FIG. 8).

When the update flag 24 is not set, namely when the update effective flag 24*a* is not set or none of the update objective flags 24*b* are set, it is judged that this cache line is not updated by a child thread and that it may be already effective. In this case, the processor starts the write processing into its own cache line (No in Step 265 of FIG. 8).

While, when the update flag 24 is set, namely when the update effective flag 24*a* is set and one of the update objective flags 24*b* is set, it is judged that this cache line has been updated by a child thread and that this cache line may be already invalid. In this case, referring to the replies of the cache line states from the other processors, whether the own cache line is actually invalid or effective is determined (Step 266 in FIG. 8). More specifically, referring to the cache line state of the processor corresponding to the set update objective flag 24*b*, in case of hit, it is judged that the cache line has been actually updated by the processor. While, in case of miss in any processor, as for all the set update objective flags 24*b*, it is judged that the update has been cancelled by the failure of the speculative execution and that the cache line has not been updated actually.

When it has not been actually updated by a child thread, the processor starts the write processing into its own cache line (No in Step 266 of FIG. 8). The write processing starts from checking whether or not the write request is a request from the parent thread (Step 271 in FIG. 8). The sequential relationship of the threads is notified from the self-processor 10 to the respective cache control units 12 of the other processors. When the write request is from a child thread, since it is the writing positioned posterior in program sequence, the data is not updated actually, and the update objective flag 24*b* corresponding to the processor having issued the write request is set, of the update flag 24 of the cache line, showing that the data has been updated by a child thread, and the processing for the write request is finished (Step 273 in FIG. 8).

While, when the write request is from the parent thread, whether or not there is an effective write data portion is checked (Step 272 in FIG. 8). This check is made by referring to the cache line state of the processor executing a thread positioned, in the program sequence, between the thread executed by the processor having issued the write request and the thread executed by the self-processor. Whether or not there is an effective write data portion is decided by the cache line state of the intervenient thread and the self-cache line state. More specifically, when as for the write data, there is the write data portion having the store flag 27 set, in the cache lines of the intervenient thread, the write data portion is invalid to the self-thread. On the contrary, when there is the write data portion having no store flag 27 set, in any cache line of the intervenient thread, the write data portion is effective to the self-thread.

When there is no effective write data portion, the cache line state is updated and the processing corresponding to the write request is finished (Step 273 in FIG. 8). While, when there is an effective write data portion, the writing processing of the write data portion is performed. Before actual writing, whether or not write back of the previous data into the main memory is necessary, is checked (Step 274 in FIG. 8). When the cache line the write request hits is definitive, namely when the speculation flag 23 is not set and the write request is a speculative request, the definitive data is written back to the main memory before the writing of the speculative data. Specifically, a write back request is supplied to the request bus 13 (Step 275 in FIG. 8), and continuously the data to be written back is transferred through the data bus 15 (Step 276 in FIG. 8). Thereafter, the processor starts the actual writing processing. While, when write back is not necessary (No in Step 274 of FIG. 8), the processor starts the actual writing processing at once. Whether the write request is speculative or definitive is known from a processor having issued the request as well as the write request, depending on whether the store instruction that is a source of the write request is speculative or definitive.

In the actual writing processing (Step 277 in FIG. 8), the above-mentioned effective write data portion is written into the data entry 26 corresponding to the own cache line. However, writing is not performed into the data entry, with the store flag 27 set, where the self-processor has already written the data.

This time, a flow dependence is detected, from the store instruction of the received write request to the speculative load instruction for the flow dependence previously executed by the self-processor (Step 278 in FIG. 8). When one of the speculation load flags 28 in the data entries corresponding to the above-mentioned effective write data portion is set, it is judged that there is a flow dependence and that the execution of the speculative load instruction failed. In this case, the cache memory 11 notifies the processor 10 of the failure in the speculative execution, and the processor 10 cancels the thread execution (Step 280 in FIG. 8).

While when none of the speculation load flags 28 in the data entries corresponding to the above-mentioned effective write data portion are set, it is judged that there is no flow dependence and that the execution of the speculative load instruction succeeded. In this case, the cache line state is updated and the processing for the write request is finished (Step 279 in FIG. 8).

While, when the cache line has been actually updated in the check of update by a child thread (Step 266 in FIG. 8), since the cache line is already invalid, the cache line is invalidated. First, before the invalidating processing, a necessity of writing back the data of this cache line is checked (Step 267 in FIG. 8). Although the cache line is invalid to the thread that this processor is currently executing, to the parent thread, it is effective in some cases. More specifically, when there is not a definitive cache line or a cache line having no speculation flag 23 set, in the cache lines of the processor that is the update source of this cache line, since this cache line holds the only definitive data, it is judged that the write back is necessary. While, when there is a definitive cache line in the cache lines of the processor that is the update source of this cache line, it is judged that the write back is not necessary.

When it is judged that the write back is necessary, a write back request is issued to the request bus 13 (Step 269 in FIG. 8), and the data to be written back is supplied to the data bus 15 (Step 270 in FIG. 8). Thereafter, the effective flag 20 of the cache line is reset so to invalidate the cache line, and the processing corresponding to the write request is finished (Step 268 in FIG. 8). While, when it is judged that the write back is not necessary, the effective flag 20 of the cache line is reset at once so to invalidate the cache line and the processing for the write request is finished (Step 268 in FIG. 8).

As mentioned above, the operation of the cache memory 11 and the cache control unit 12 when receiving a write request and the same operation for the write request portion when receiving a read/write request, from the other processor through a bus, have been described. As mentioned above, a feature of the embodiment is that bus requests toward the same address are combined with each other hence to be issued at once. Further, another feature of the embodiment is that the processing toward the cache line which may be updated and invalid is impliedly executed by the bus request. This can lessen the number of the bus requests being issued, the deterioration of the performance caused by the bus competition, and further the power consumption in the buses. In the above description, although a read request and a write request destined for the same address are combined with each other as a read/write request, a write back request for the same address may be integrated with the above request.

When the execution of a thread is cancelled in a case of failing in the execution of a speculative load instruction, the record of the speculatively executed load instructions is abandoned by resetting all the speculation load flags 27 of all the cache lines forming the cache memory 11. This time, of the cache lines forming the cache memory 11, a speculative cache line is invalidated, thereby abandoning the invalid data that failed in the speculative execution. Concretely, when the execution of a thread is canceled in a processor that is the cause of this speculative cache line, of the speculative cache lines, the effective flag 20 of this cache line is reset, so to invalidate this cache line. According to this embodiment, the speculation flag 23 indicating that a cache line is speculative is formed by a plurality of bits, which can specify a processor causing the cache line to be speculative. Therefore, in the conventional method forming the speculation flag by one bit, also a cache line where invalidation is not necessary strictly is invalidated, while according to this embodiment, since only a cache line where invalidation is necessary strictly is invalidated, a probability of causing a cache miss is small and the high-speed thread parallel processing is possible.

While, when the speculative thread execution is definitive, the definitive data succeeding in the speculative execution is validated by defining the speculative cache line, of the cache lines forming the cache memory 11. This processing can be realized by resetting the speculation flag 23, the store flag 27, and the speculation load flag 28. At least the execution of the thread positioned at the top in program sequence, of the threads executed by the respective processors, is definite. As for the other threads, the execution of some threads is definite and the execution of others is speculative. In any case, when the execution of all the precedent threads is finished and the self-thread becomes the top thread under execution, the execution becomes definitive.

Figure 9:
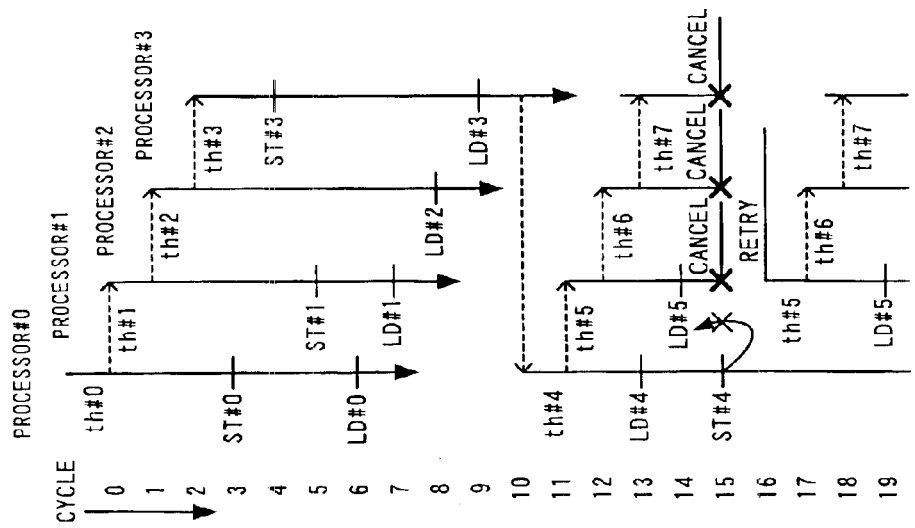
FIG. 9 is a view for use in describing the state of the cache line and the thread execution in a multiprocessor system having four processors.

The concrete example of the operation according to the above-mentioned embodiment will be described with reference to FIGS. 5 to 8 and FIG. 9. FIG. 9 is a view for use in describing the state of a cache line and the state of thread execution, in some execution cycles (cycle 0 to cycle 19), in a multiprocessor having four processors #0 to #3, showing the cycle number, the state of the thread execution, and the cache line state from the left.

With reference to the state of the thread execution (FIG. 9(*a*)), assume that eight threads, the thread 0 to the thread 7 (th#0 to th#7) are executed. In the cycle 0, the thread 1 is created from the thread 0 executed by the processor #0, and the execution starts in the processor #1. Next, in the cycle 1, the thread 2 is created from the thread 1, and the execution starts in the processor #2. In the cycle 2, the thread 3 is created from the thread 2, and the execution starts in the processor #3. In the cycle 10, the thread 4 is created from the thread 3, and the execution starts in the free processor #0 which has finished the execution of the thread 0. In the cycle 11, the thread 5 is created from the thread 4, and the execution starts in the processor #1. In the cycle 12, the thread 6 is created from the thread 5, and the execution starts in the processor #2. In the cycle 13, the thread 7 is created from the thread 6, and the execution starts in the processor #3. Namely, in the program sequence, the thread 0 is the top, then the thread 1, the thread 2, the thread 3, the thread 4, the thread 5, and the thread 6 follow in this order, and the thread 7 is the last.

Assume that five store instructions; store 0 to store 4 (ST#0 to ST#4) and six load instructions; load 0 to load 5 (LD#0 to LD#5) destined for the same address are executed. The state of the cache lines corresponding to the target address of these store instructions and load instructions is shown in the cache line state (FIG. 9(*b*)). From the left, it shows the cache line state of the cache memory #0 inherent to the processor #0, the cache line state of the cache memory

1 inherent to the processor #1, then the cache line state of the cache memory #2 inherent to the processor #2, then the cache line state of the cache memory #3 inherent to the processor #3. In the respective cache line states, from the left, only the speculation flag 23, the update flag 24, the store flag 27, the speculation load flag 28, and the data entry 26 are described and the other flags and entries are omitted. In the cache line state in the drawing, a cache line represented by a solid line is effective (with the effective flag 20 set) and a cache line represented by a dotted line is invalid (with no effective flag 20 set).

In the cycle 0, assume that the speculation flag 23, the update flag 24, the store flag 27, and the speculation load flag 28 are reset in any cache memory and that the same definitive data "X" is held there.

With reference to the thread execution state (FIG. 9(a)), the store 0 is executed by the processor #0 in the cycle 3. Assuming that the write value of the store 0 is "0", a write request is issued to the other processors; the processor #1, the processor #2, and the processor #3 which share the data of the same address with each other (Step 226 in FIG. 6), and the value "0" is written into the self-cache memory #0 (Step 228 in FIG. 6). Which processors to share the data with is determined by reference to the share flag 22 of the cache lines.

While, the processing for a write request is performed in the processors #1, #2, #3 having received the write request. Concretely, since this is a write request from the parent thread for the above processors and it is effective write data, "0" is written into the respective cache memories (Step 277 in FIG. 8).

Next, in the cycle 4, the store 3 is executed by the processor #3. Here, assume that the thread 3 is a speculative thread, and accordingly that the store 3 is a speculative execution. Assuming that the write value of the store 3 is "3", a write request is issued to the other processors sharing the data with each other; the processor #0, the processor #1, and the processor #2 (Step 226 in FIG. 6), and "3" is written into the self-cache memory #3 (Step 228 in FIG. 6). The flag portion corresponding to the self-processor, of the flag 23 and the store flag 28 are set.

Upon receipt of the write request, the processors #0, #1, and #2 perform the processing corresponding to the write request. Concretely, since this write request is a request coming from a child thread for the above processors, each flag portion corresponding to the processor #3 that is the update-causing processor, of the update objective flags 24b of the update flag 24, is set (Step 273 in FIG. 8).

In the cycle 5, the store instruction 1 is executed in the processor #1. Here, assume that the thread 1 is a speculative thread and that accordingly, the store 1 is a speculative execution. Assuming that the write value of the store instruction is "1", a write request is issued to the other processors which share the data with each other; the processor #0, the processor #2, and the processor #3 (Step 226 in FIG. 6), and "1" is written into the self-cache memory #1 (Step 228 in FIG. 6). Further, the flag portion corresponding to the self-processor, of the speculation flag 23, and the store flag 28 are set.

Upon receipt of the write request, the processors #0, #2, and #3 perform the processing corresponding to the write request. Since this write request is a request coming from a child thread for the processor #0, the flag portion corresponding to the processor #1 that is the update-causing processor, of the update objective flags 24b of the update flag 24, is set (Step 273 in FIG. 8). Since this is a request coming from the parent thread for the processor #2 and effective write data, "1" is written into the cache memory #2 (Step 277 in FIG. 8). Further, since the speculative data is written, the flag portion corresponding to the processor #1 that is the write-causing processor, of the speculation flag 23, is set (Step 280 in FIG. 8). For the processor #3, although this write request is a request coming from the parent thread and effective write data, since the speculative writing has been already performed by the self-thread (the store flag 28 has been set), "1" is not written here (Step 277 in FIG. 8).

In the cycle 6, the load 0 is executed in the processor #0. The load 0 hits the cache memory #0 and the data "0" is read out (Step 206 in FIG. 5). There exists an anti-dependence from the load 0 to the store 1 and the store 3. Namely, the load 0 has to refer to the value of the store 0, not to the data of the store 1 and the store 3 which have been executed earlier than the store 0 but are positioned posterior to the store 0 in program sequence. As mentioned above, according to this embodiment, an anti-dependence can be solved and the value "0" of the store 0 is correctly referred to.

Similarly, in the cycle 7, the load 1 is executed in the processor #1. The load 1 hits the cache memory #1 and the data "1" is read out (Step 206 in FIG. 5). Since the load 1 is a speculative execution, the speculation load flag 27 is set.

Similarly, in the cycle 8, the load 2 is executed in the processor #2. The load 2 hits the cache memory #2 and the data "1" of the store 1 which was executed by the processor #1 is correctly read out (Step 206 in FIG. 5). Since the load 2 is a speculative execution, the speculation load flag 27 is set. Thus, according to this embodiment, when executing a store instruction, since the writing into the cache memories on the side of a child thread is simultaneously performed, the data can be referred to without missing the cache memory on the side of the child thread. Namely, in case of executing a store instruction, it is effective in reducing the communication cost between threads and inhibiting the performance deterioration even in case of a large communication between threads, compared with the conventional method of invalidating the cache memories on the side of a child thread.

In-the cycle 9, the load 3 is executed in the processor #3. The load 3 hits the cache memory #3 and the data "3" is correctly read out (Step 206 in FIG. 5). There exists an output dependence between the store 1 and the store 3. Namely, the store 1 has been executed later than the store 3 but it is positioned prior to the store 3 in the program sequence, and the value of the store 3 needs to be referred to by the load 3 that is the posterior load instruction. As mentioned above, according to this embodiment, the output dependence can be solved, and the value "3" of the store 3 is correctly referred to.

In the cycle 7, since the execution of the thread 0 is finished, one of the update objective flags 24b of the update flag 24 is set and accordingly the update effective flag 24a is set in the cache memory #0. Thus, this cache line is updated by the data held by the cache memory #1 and the cache memory #3, and therefore, it proves that the cache line may be invalid. By finishing the execution of the thread 0, the execution of the thread 1 which has been speculatively executed becomes definite. In the cache memory #1, the speculation flag 23, the speculation load flag 27 and the store flag 28 are reset and the data "1" is defined.

Similarly, since the execution of the thread 1 is completed in the cycle 8, one of the update objective flags 24b of the update flag 24 is set and accordingly the update effective flag 24a is set in the cache memory #1. Thus, it proves that this cache line may be invalid because of being updated by the data held by the cache memory #3. By completing the execution of the thread 1, the execution of the thread 2 which has been speculatively executed becomes definite. In the cache memory #2, the speculation flag 23 and the speculation load flag 27 are reset and the data "1" is defined.

Similarly, since the execution of the thread 2 is completed in the cycle 9, one of the update objective flags 24b of the update flag 24 is set and accordingly the update effective flag 24a is set in the cache memory #2. Thus, it proves that the cache line may be invalid because of being updated by the data held by the cache memory #3. By completing the execution of the thread 2, the execution of the thread 3 which has been speculatively executed becomes definite. In the cache memory #3, the speculation flag 23 and the speculation load flag 27 are reset and the data "3" is defined.

Though the execution of the thread 3 is completed in the cycle 11, the update effective flag 24a doesn't have to be set because the cache memory #3 has not been updated by a child thread (none of the update objective flags 24b is set). Namely, the data "3" of the cache memory #3 is defined as the data of the relevant address. Thus, according to the embodiment, when a thread is completed, there is nothing to do but to set the update flag 24a depending on the set and reset state of the update objective flags 24b. Therefore, compared with the conventional method of causing write-back concentration and invalid cache lines, this embodiment is effective in extremely reducing the cost of finishing threads and achieving a high performance of the thread parallel processing.

In the cycle 10, the execution of the thread 4 starts in the processor #0. In the cycle 13, the load 4 is executed. At this point, since the thread 4 is the top-positioned thread in the program sequence, of the currently executing threads, the thread execution is definite, and accordingly, the load 4 is executed definitively. The load 4 hits the cache memory #0, but a read request is issued to the other processors sharing data with each other; the processor #1, the processor #2, and the processor #3 (Step 203 in FIG. 5) because the update flag 24 is set. With reference to the replies from the other processors, since it proves that the cache memory #0 has been actually updated, from view of the cache memory #1 and the cache memory #3, the cache memory #0 is refilled (Step 213 in FIG. 5). In this case, the data of the cache line including the data "3" is supplied from the cache memory #3 and the data "3" is read out (Step 206 in FIG. 5).

Of the processors #1, #2, and #3 having received the read request, since the update flag 24 is set in the processor #1 and the processor #2 and it proves that they have been actually updated by the cache memory #3, their cache lines are invalidated (Step 253 in FIG. 7). While, in the processor #3, the cache memory #3 holds the effective refill data and supplies the refill data including the data "3" to the processor #0 (Step 258 in FIG. 7).

In the cycle 14, the load 5 included in the thread 5 is executed in the processor #1. Here, assume that the thread 5 is a speculative thread. Since the load 5 misses the cache memory #1, a read request is issued to the other processors; the processors #0, #2, and #3 (Step 209 in FIG. 5), and waiting for the refill data to arrive, the processor #1 refills the cache memory #1 with the refill data. In this case, the data of the cache line including the data "3" is supplied from the cache memory #0 and the data "3" is read out (Step 206 in FIG. 5). Since the load 5 is a speculative execution, the speculation load flag 27 is set (Step 207 in FIG. 5).

Of the processors #0, #2, and #3 having received the read request, the processor #0 holds the effective refill data in the cache memory #0 and supplies the refill data including the data "3" to the processor #1 (Step 258 in FIG. 7). Since the read request misses the cache memory #2, the processor #2 replies this effect to the processor #1 (Step 247 in FIG. 7). Though the cache memory #3 holds the effective refill data, the processor #3 doesn't supply the refill data because it proves that the cache memory #0 of the processor #0 executing the intervening thread in the program sequence also holds the effective data.

In the cycle 15, the store 4 is executed in the processor #0. Assuming that the write value of the store 4 is "4", a write request is issued to the other processors sharing data with each other; the processors #1 and #3 (Step 226 in FIG. 6) and "4" is written into the self-cache memory #0 (Step 228 in FIG. 6).

Upon receipt of the write request, the processors #1 and #3 perform the processing corresponding to the write request. Since this is the write request coming from the parent thread for the processor #1 and effective write data, "4" is written into the cache memory #1 (Step 277 in FIG. 8). In the detecting processing of a flow dependence (Step 278 in FIG. 8), since the speculation load flag 28 is set in the cache line of the cache memory #1, as for the write request, a flow dependence is detected. Namely, the speculative load 5 having been executed by the processor #1 has a flow dependence from the store 4 executed by the processor #0 that is the cause of the write request, but the above two instructions are inverted, and therefore, it is found that the speculative execution of the load 5 failed. Concretely, since the load 5 is positioned posterior to the store 4 in the program sequence, the load 5 should have read out the write data "4" of the store 4 but actually read out the write data "3" of the store 3 that is the wrong value. To the effect that a flow dependence was detected is notified to the processor #1 and recovery processing for the failure in the speculative execution starts.

In the processor #3 having received the write request, this write request is a request coming from the parent thread and effective write data, and therefore "4" is written into the cache memory #3 (Step 277 in FIG. 8).

In the recovery processing for the failure of the speculative execution of the load 5 by the processor #1, the execution of the failed thread and all the child threads coming from the above thread is canceled and retried, thereby recovering the thread execution normally. More specifically, in the cycle 15 where the failure of the speculative execution is found, the execution of the failed thread 5, and the thread 6 and the thread 7 that are its child threads is canceled, and in the cycle 16, the tread 5 and successively the thread 6 and the thread 7 are executed again. In the canceling processing of the threads, all the speculation load flags 27 of all the cache lines forming the cache memories are reset and the speculative cache lines where invalidation is necessary are invalidated. For example, in the cache memory #1, the speculation load flag 28 is reset. Since the cache line is definitive, invalidation is not performed. Also in the cache memory #3, since the cache line is definitive, invalidation is not performed. As the result of retrying the thread 5 and the threads 6 and 7, in the cycle 19, the processor #1 executes the load 5 again and reads out the correct data "4".

As mentioned above, the concrete operation according to the embodiment has been described. According to the embodiment, when a processor executing a thread executes a store instruction, the store data of the corresponding store instruction is stored in the cache memory inherent to the processor, and additionally, with reference to the store flag 27 of all the cache lines holding the same address data, the effective data portion is calculated and then only the effective data portion is updated when there is a cache line having the same address as that of the store instruction in the cache memory inherent to the processor executing a child thread of the thread. Therefore, it is possible to refer to the data created by the parent thread without missing the cache memory on the side of a child thread. Namely, when executing a store instruction, since the communication cost between threads is lower than in the conventional method of invalidating the cache memory on the side of a child thread, the performance deterioration is smaller even in case of a large communication between threads.

Further, no occurrence of invalidation of a cache line according to the writing processing of the parent thread enables a provision of a plurality of data entries 26 within one cache line. Namely, compared with the conventional cache line which requires the address tag and the respective flags for every data entry that is the minimum writing unit of a store instruction, the present invention requires a provision of a set of address tag and the respective flags only for a plurality of data entries, and therefore, the hardware amount necessary for installation is small.

While, when there is a cache line of the same address as that of a store instruction, in a cache memory inherent to the processor executing a parent thread positioned prior in the program sequence to a thread executing the store instruction, it is impossible to update the data, and by setting the update flag 24, the processor records only that the data may be invalid in the next executed thread. Therefore, when gaining access to the above address, in the executed thread, since a possibility that the refilling processing occurs is great, there is a case of deteriorating the execution performance of a thread, under the situation where the size of a thread becomes very small and the communication amount between threads is extremely large.

Figure 10:
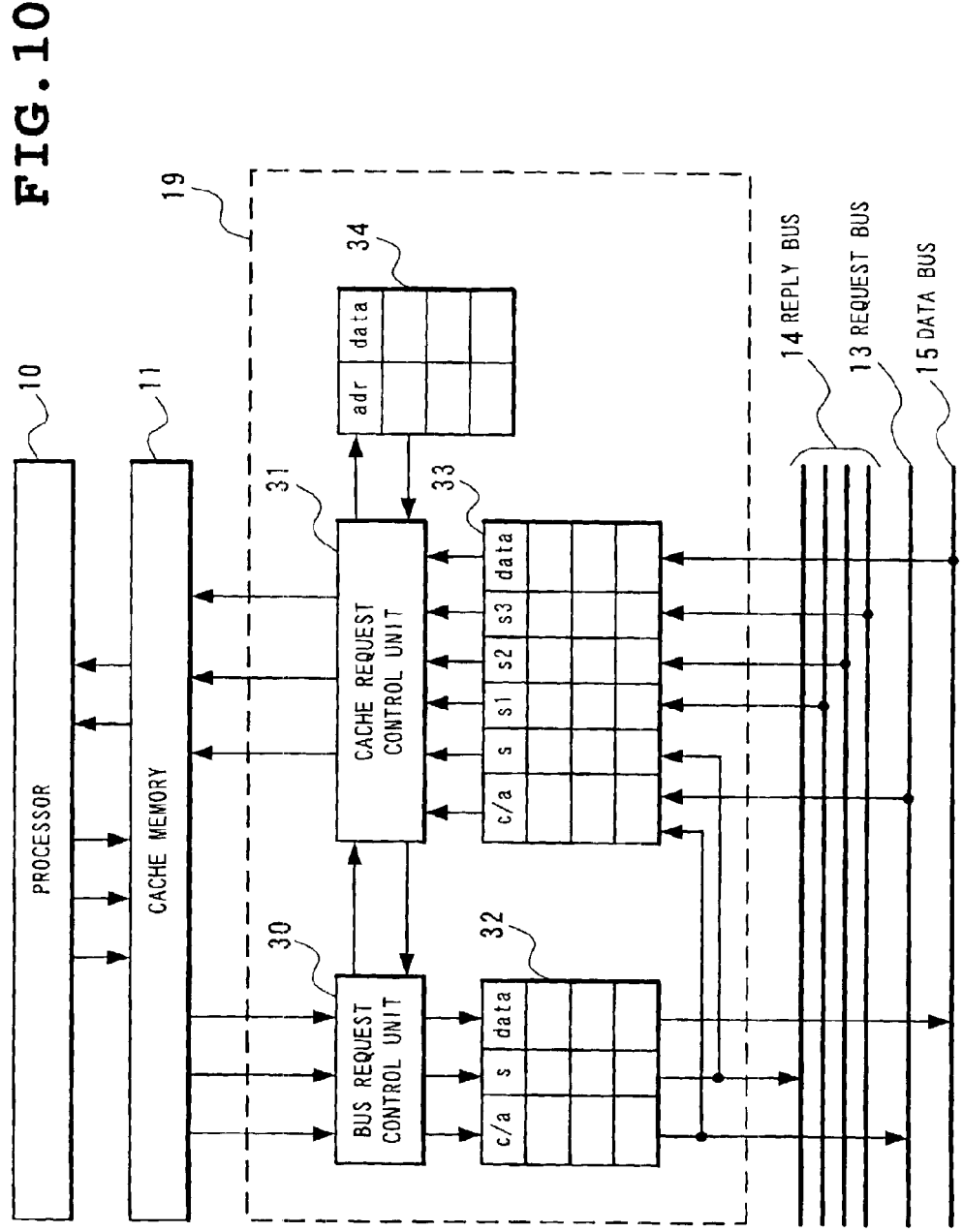
FIG. 10 is a block diagram showing the details of the second embodiment of a cache control unit.
Figure 11:
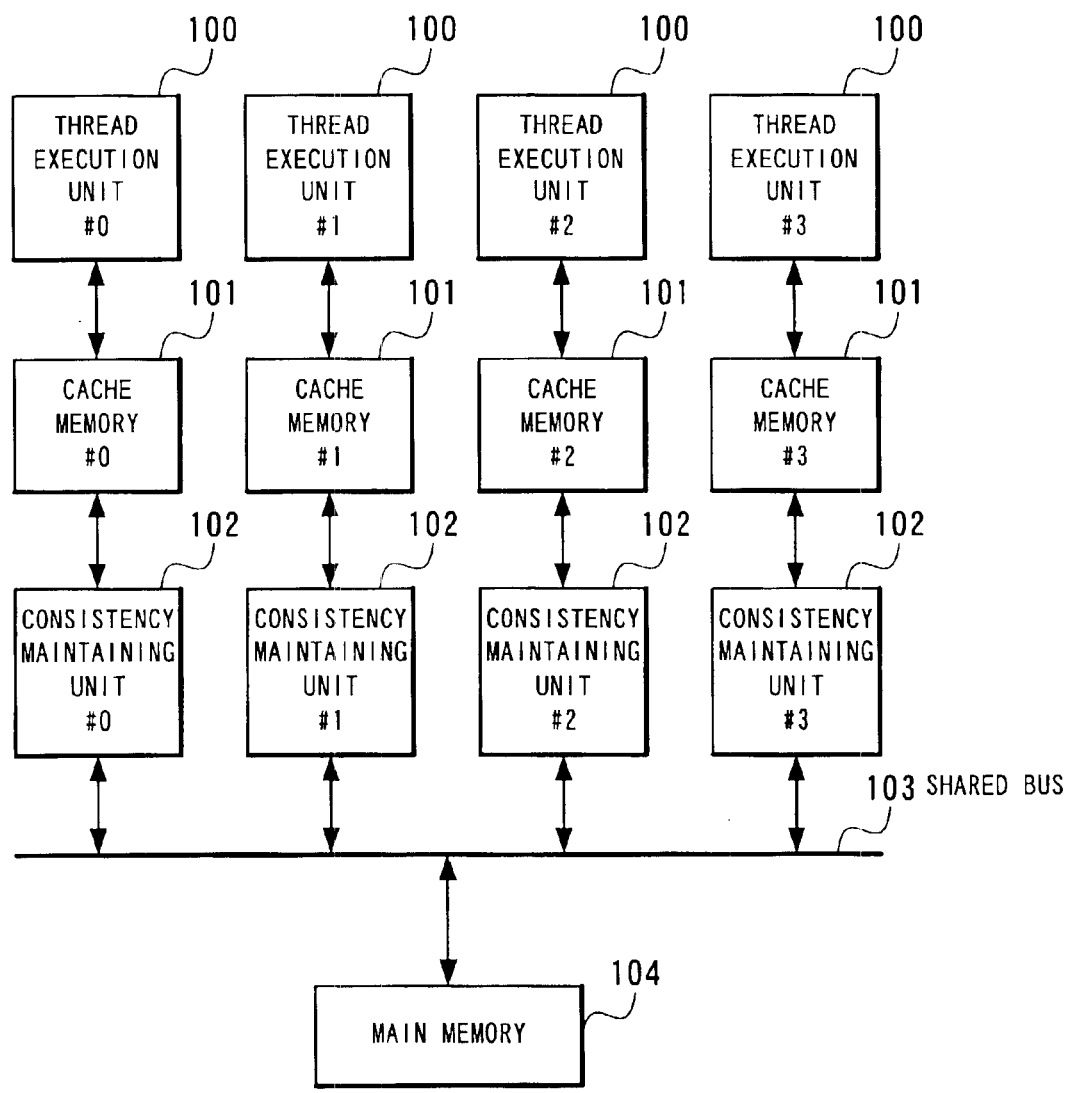
FIG. 11 is a block diagram showing the structure of a multiprocessor system including the conventional cache memories.
Figure 12:
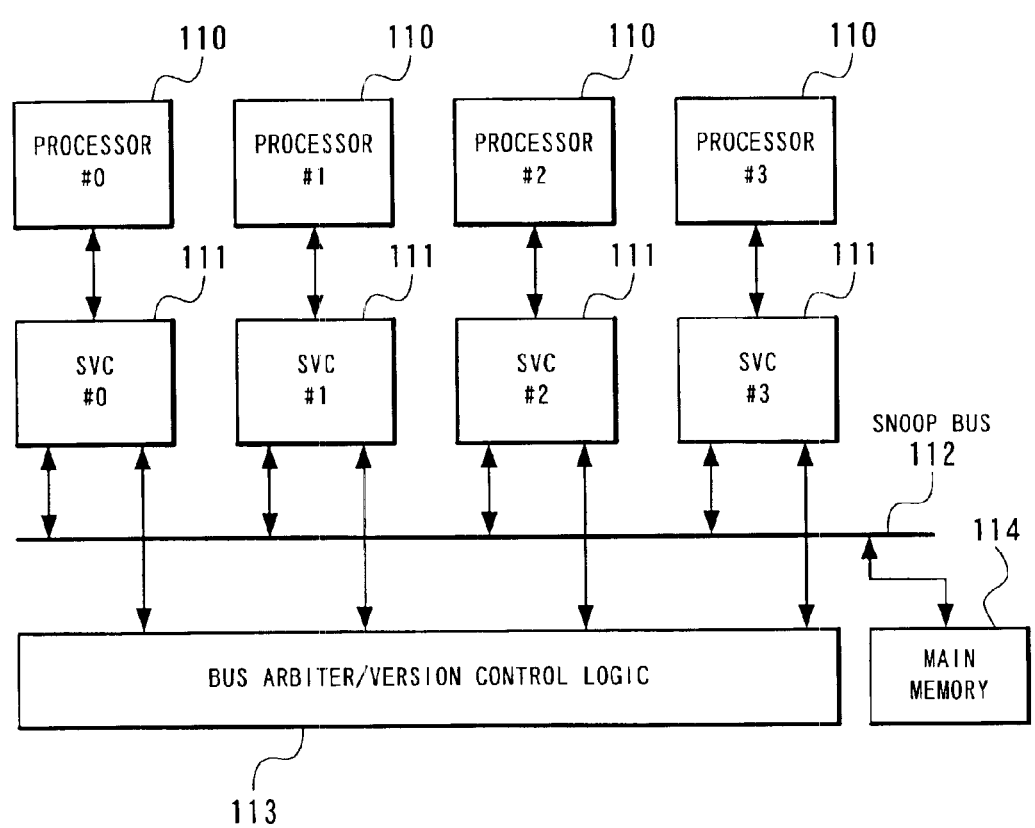
FIG. 12 is a block diagram showing the structure of a multiprocessor system including the conventional cache memories.

To cope with the above problem, a buffer called a differential buffer may be provided in a cache memory according to the present invention. The second embodiment of the present invention comprising a differential buffer is shown in FIG. 10. Referring to FIG. 10, a cache control unit 19 comprises at least a bus request control unit (reference numeral 30), a cache request control unit (reference numeral 31), a bus request output buffer (reference numeral 32), and a bus request input buffer (reference numeral 33), and additionally a differential buffer 34.

The differential buffer 34 is connected to the cache request control unit 31, in the cache control unit 19. The differential buffer 34 is a buffer capable of holding the address and the data, and when a child thread positioned posterior to the self-thread in the program sequence executes a store instruction, if there is a cache line of the same address as that of the store instruction, in the self-cache memory, the update flag 24 of this cache line is set and the address of the store instruction and the store data are stored in the differential buffer 34.

Upon completion of the execution of a thread, when there is a cache line corresponding to the address stored in the differential buffer 34, in the cache memory 11, the data of the address stored in the differential buffer 34 is written into the cache line and further the update flag 24 of the cache line is reset. According to this processing, access to the address of the next thread assigned to the self-processor results in hitting a cache memory. Namely, by providing the differential buffer 34, the present invention has a great effect that the execution performance of a thread is not deteriorated, even under the situation where the size of a thread is very small and the communication amount between threads is extremely large.

As mentioned above, the embodiments of the present invention have been described. In the above description, although the number of the processors is four, the number of the processors is not restricted to four, but the present invention can be adopted to a multiprocessor system including two and more processors. A thread concerned with the present invention may be created statically at a compile time of a program, or it may be created dynamically at an execution time of a program, and the size of a thread is one instruction and more.

As mentioned above, according to the present invention, when there is a cache line of the same address as that of the data rewritten by a parent thread, in a cache memory on the side of a child thread, the cache line is rewritten. Accordingly, it becomes possible to refer to the data created by the parent thread without missing the cache memory on the side of a child thread. Therefore, when a store instruction is executed, since the communication cost between threads is small, the deterioration in the performance is small and the high speed thread parallel processing is enabled in case of a large communication between threads, compared with the conventional method, according to the article 2, of invalidating a cache memory on the side of a child thread.

The operation of setting the update flag is only to do at completion of a thread. Since concentration of the write back processing of the data and the invalidation of a cache line don't occur in a cache memory at completion of a thread, differently from the conventional method according to the article 1, the present invention is effective in high speed thread parallel processing. Further, since the number of the refilling processing accompanied by a cache miss is small and the write back processing doesn't occur at completion of a thread, the power consumption in a cache memory is small.

Further, since the invalidation of a cache line caused by the writing processing of a parent thread doesn't occur, differently from the article 2, a plurality of data entries that are the minimum writing units of a store instruction can be provided in one cache line. Namely, compared with the conventional cache line requiring the address tag and the respective flags for every data entry, the present invention has only to provide a set of address tag and the respective flags for the plurality of data entries, and therefore the hardware amount necessary for installation is small.

According to the differential buffer 34 of the present invention, the execution performance of a thread is not deteriorated and the high speed thread parallel processing is possible even under the situation where the size of a thread is extremely small and the communication amount between threads is very large.

In a cache line according to the present invention, the share flag 22 indicating that the data is shared among the processors is formed by a plurality of bits and it can hold the individual data-sharing processors. When supplying a bus request, since the bus request is supplied only to the sharing processors, access to the cache memory doesn't occur in a processor which doesn't share the data. Therefore, the performance deterioration caused by the access competition of a cache memory is small and the power consumption in a cache memory is small.

In a cache line according to the present invention, the speculation flag 23 indicating that the data of the cache line is speculative is formed by a plurality of bits, and it can specify a processor that is the cause of the speculative cache line. In the conventional method forming the speculation flag by one bit, even a cache line where invalidation is strictly unnecessary will be invalidated, while, according to the present invention, only a cache line where invalidation is strictly necessary will be invalidated. Therefore, a probability of a cache miss is low and the high speed thread parallel processing is possible.

According to the present invention, bus requests toward the same address can be combined with each other and simultaneously issued, the processing to a cache line which has been updated and may be invalid can be impliedly executed according to the bus request. Therefore, the number of the issued bus requests can be lessened, and the performance deterioration caused by the bus competition and the power consumption are small.

According to the present invention, the positional relationship of the data in program sequence is not directly stored nor controlled, but it is controlled according to the information whether the data has been updated or not by a child thread, with the update flag. Therefore, the present invention can achieve a simple control and high speed performance with small hardware amount.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A cache memory control method in a multiprocessor system, formed by a plurality of processors respectively having cache memories, for executing a plurality of threads whose execution sequence is defined, the method comprising:

executing a first thread by a first processor of said processors;

executing a second thread by a second processor of said processors; and executing a third thread by a third processor of said processors, wherein, when said first processor executing said first thread writes data, said first processor writes said data in said cache memory of said first processor; when there is a cache line corresponding to a writing target address of said data, in said cache memory of said second processor executing said second thread positioned posterior to said first thread in the execution sequence, said first processor updates said cache memory of said second processor; and when there is a cache line corresponding to the writing target address of said data, in said cache memory of said third processor executing said third thread prior to said first thread in the execution sequence, said first processor records in said cache memory of said third processor that said first processor executing said first thread has written data into the cache line of said first processor, and wherein, when the data written into the cache line by said first processor is based on speculative processing, when said third processor executing said third thread retrieves data from said cache memory of said third processor that corresponds to a memory address in a same cache line as the cache line written into said cache memory of said first processor, said third processor treats the retrieved data as possibly invalid, and wherein the retrieved data is later determined to be valid or invalid based on whether or not the speculative processing performed by said first processor is canceled.

2. The cache memory control method as set forth in claim 1, in which a store flag which is set at a writing time and reset at a completion of said first, second and third threads in said first, second and third processors, respectively, for controlling writing execution of said first, second and third processors, is provided in every cache line forming said respective cache memory of said first, second and third processors, and in an update processing performed by said first processor, a possibility of updating a target cache line of the update processing and an update target data portion are decided with reference to content of said store flag of a cache line in said cache memory of said second processor and content of said store flag of said cache line existing in said cache memory of said processors executing a thread positioned in the execution sequence between said first thread and said second thread.

3. The cache memory control method as set forth in claim 1, in which an update objective flag for storing that said first or second processor has written data, for said first and second processors respectively executing said first and second threads positioned posterior in program sequence to said third thread and an update effective flag indicating whether said update objective flag is effective or not, are provided in every cache line forming said corresponding cache memory of said third processor, and when said third processor gains access to a cache line in said corresponding cache memory of said third processor, hence to find that said update objective flag and said update effective flag are both effective, whether said cache line is effective or invalid is determined, referring to whether or not there is a cache line of said writing target address in said cache memory of said first or second processor having written the data, which is determined by said update objective flag, and when the cache line is invalid, effective data is transferred from said cache memory of said first or second processor or a main memory, so to be stored in said cache line of said corresponding cache memory of said third processor.

4. The cache memory control method as set forth in claim 1, in which an update objective flag for storing that said first or second processor has written data, for said first and second processors respectively executing said first and second threads positioned posterior in program sequence to said third thread and an update effective flag indicating whether said update objective flag is effective or not, are provided in every cache line forming said corresponding cache memory of said third processor, and when said first or second processor gains access to a cache line in said cache memory of said third processor executing said third thread, hence to find that said update objective flag and said update effective flag are both effective, whether said cache line is effective or invalid is determined, referring to whether or not there is a cache line of said writing target address in said cache memory of said first or second processor having written said data, which is determined by said update objective flag, and when the cache line is invalid, the cache line is invalidated in the corresponding cache memory of said third processor.

5. The cache memory control method as set forth in claim 1, in which when said second processor executing said second thread positioned posterior in program sequence to said first thread writes data, a buffer for storing said writing target address and said write data is provided for said first processor, and upon completion of execution of said first thread, when there is a cache line corresponding to said address stored in said buffer, data of said address stored in said buffer is written into said cache line of said first processor.

6. The cache memory control method as set forth in claim 1, in which a share flag for storing which of said processors to share data with, as a data sharing processor, is provided in every cache line forming said cache memory of said first processor, said data sharing processor is specified with reference to said share flag when one of said processors supplies a bus request, and said bus request is supplied only to said data sharing processor.

7. The cache memory control method as set forth in claim 1, in which when data of a cache line is speculative, a speculation flag for indicating that said data is speculative and specifying which of said processors is a cause of said speculative data, is provided in every cache line forming said respective cache memory of said first, second or third processors, and when the execution of said first, second or third thread is canceled in said first, second or third processor and further canceled also in another processor that is the cause of a speculative cache line, of said speculative cache lines existing in said respective cache memory of said first, second or third processor having canceled execution of said first, second or third thread, this cache line is invalidated.

8. A cache memory control method in a multiprocessor system, formed by a plurality of processors respectively having cache memories, for executing a plurality of threads whose execution sequence is defined, the method comprising:

executing a first thread by a first processor of said processors;

executing a second thread by a second processor of said processors; and executing a third thread by a third processor of said processors, wherein, when said first processor executing said first thread writes data, said first processor writes said data in said cache memory of said first processor, when there is a cache line corresponding to a writing target address of said data, in said cache memory of said second processor executing said second thread positioned posterior to said first thread in the execution sequence, said first processor updates said cache memory of said second processor; and when there is a cache line corresponding to the writing target address of said data, in said cache memory of said third processor executing said third thread prior to said first thread in the execution sequence, said first processor records in said cache memory of said third processor that said first processor executing said first thread has written data into the cache line of said first processor, in which a cache control unit is provided in every cache memory, and said cache control units are connected with each other through a bus and said respective cache control units and a main memory shared among said processors are mutually connected through a bus, and in every cache line of said cache memory of each of said processors, provided are an effective flag indicating whether said cache line is effective or invalid, an update flag indicating whether said cache line disagrees with said main memory, a share flag indicating whether said cache line is shared with another of said processors, a speculation flag indicating whether said cache line includes speculative data and specifying which of said processors that is the cause of said speculative data, an update objective flag for storing into said cache line an indication that one of said processors has written data, for every processor executing a thread positioned posterior in execution sequence, an update effective flag indicating that when one of said update objective flags is set, said cache line has been updated by one of said processors corresponding to said set update objective flag and that said cache line may be invalid, a store flag indicating presence or absence of writing into said cache line by said respective processor, and a speculation load flag indicating presence or absence of reading out said speculative data by said respective processor to said cache line, and said cache control unit performs processing of maintaining consistency of data of said cache memory, at input and output time of a bus request concerned with read and write, based on cache line states of the other cache memories obtained by exchanging said cache line states including said effective flag, said update flag, said share flag, said speculation flag, said update objective flag, said update effective flag, and said store flag, said cache line state of said self-cache memory, and the execution sequence of a thread executed by said respective processor and said threads executed by all other of said processors.

9. A multiprocessor system, comprising:

a plurality of processors respectively having cache memories and cache control units and sharing a main memory, said cache control units being connected with each other by a bus and said respective cache control units and said main memory being connected with each other by a bus, for executing a plurality of threads whose execution sequence is defined, said plurality of processors including first, second and third processors respectively executing first, second and third threads, in which the cache control unit of said first processor:

writes data into a cache memory of said first processor executing said first thread when said first processor writes data; updates said cache memory of said second processor when there is a cache line corresponding to a writing target address of said data, in said cache memory of said second processor executing said second thread positioned posterior to said first thread in the execution sequence; and records in said cache memory of said third processor that said first processor has written data into said cache line when there is a cache line corresponding to said writing target address of said data, in said cache memory of said third processor executing said third thread prior to said first thread in the execution sequence, wherein, when the data written into the cache line by said first processor is based on speculative processing, when said third processor executing said third thread retrieves data from said cache memory of said third processor that corresponds to a memory address in a same cache line as the cache line written into said cache memory of said first processor, said third processor treats the retrieved data as possibly invalid, and wherein the retrieved data is later determined to be valid or invalid based on whether or not the speculative processing performed by said first processor is canceled.

10. A multiprocessor system, comprising:

a plurality of processors respectively having cache memories and cache control units and sharing a main memory, said cache control units being connected with each other by a bus and said respective cache control units and said main memory being connected with each other by a bus, for executing a plurality of threads whose execution sequence is defined, said plurality of processors including first, second and third processors respectively executing first, second and third threads, in which the cache control unit of said first processor:

writes data into a cache memory of said first processor executing said first thread when said first processor writes data; updates said cache memory of said second processor when there is a cache line corresponding to a writing target address of said data, in said cache memory of said second processor executing said second thread positioned posterior to said first thread in the execution sequence; and records in said cache memory of said third processor that said first processor has written data into said cache line when there is a cache line corresponding to said writing target address of said data, in said cache memory of said third processor executing said third thread prior to said first thread in the execution sequence, in which in every cache line of said cache memory of each of said processors, provided are an effective flag indicating whether said cache line is effective or invalid, an update flag indicating whether said cache line disagrees with said main memory, a share flag indicating whether said cache line is shared with another of said processors, a speculation flag indicating whether said cache line includes speculative data and specifying which of said processors that is the cause of said speculative data, an update objective flag for storing into said cache line an indication that one of said processors has written data, for every processor executing a thread positioned posterior in the execution sequence, an update effective flag indicating that when one of said update objective flags is set, said cache line has been updated by another of said processors corresponding to said set update objective flag and that said cache line may be invalid, a store flag indicating presence or absence of writing into said cache line by said respective processor, and a speculation load flag indicating presence or absence of reading out said speculative data by said respective processor to said cache line, and the cache control unit updates a cache line state of said cache memory of said respective processor, at input and output time of a bus request concerned with read and write, based on said cache line states of said other cache memories obtained by exchanging said cache line states including said effective flag, said update flag, said share flag, said speculation flag, said update objective flag, said update effective flag, and said store flag, said cache line state of said cache memory of said respective processor, and the execution sequence of a thread executed by said respective processor and said threads executed by all other of said processors, when said first processor updates said cache memory of said first processor, if said data of the same address exists in said cache memory of said second processor executing said second thread posterior in the execution sequence to said first thread, said cache control unit of said second processor simultaneously updates said cache memory of said second processor, and if said data of the same address exists in said cache memory of said third processor executing said third thread prior in the execution sequence to said first thread, said cache control unit of said third processor doesn't rewrite said cache memory of said third processor but stores information to the effect that said data of said same address has been rewritten, into said update objective flag in said cache line of said cache memory of said third processor, and when said third processor finishes said third thread, said update effective flag is set in all said cache lines of said cache memory of said third processor or a cache line with one of said update objective flags set there, a cache line with said update effective flag set and with one of said update objective flags set may be invalid, and a cache line with said update effective flag reset or with all said update objective flags reset may be effective, and whether a cache line which may be invalid is actually invalid or effective is examined during the execution of a next thread by said third processor.

11. The multiprocessor system as set forth in claim 10, in which the cache control unit of said second processor decides a possibility of updating a target cache line of update processing and an update target data portion, with reference to content of said store flag of a cache line in a target cache memory of the update processing and content of said store flag of a cache line existing in said cache memory of said processors executing a thread positioned in the execution sequence between said first thread and said second thread.

12. The multiprocessor system as set forth in claim 10, in which when said third processor gains access to a cache line in said cache memory of said third processor, hence to find that said update objective flag and said update effective flag are both effective, said cache control unit of said third processor determines whether said cache line is effective or invalid, referring to whether or not there is a cache line of a writing target address, in said cache memory of said first or second processor having written said data, which is determined by said update objective flag, and when the cache line is invalid, transfers effective data from said cache memory of said first or second processor or a main memory, to the cache line of said cache memory of said third processor, to store said effective data therein.

13. The multiprocessor system as set forth in claim 10, in which when said first or second processor gains access to a cache line in said cache memory of said third processor executing said third thread, hence to find that said update objective flag and said update effective flag are both effective, said cache control unit of said third processor determines whether said cache line is effective or invalid, referring to whether or not there is a cache line of said writing target address, in said cache memory of said first or second processor having written said data, which is determined by said update objective flag, and when the update objective flag indicates that the cache line is invalid, invalidates the cache line.

14. The multiprocessor system as set forth in claim 10, in which when said second processor executing said second thread positioned posterior in program sequence to said first thread writes data, a buffer for storing said writing target address and said write data is provided, and upon completion of execution of said first thread, when there is a cache line corresponding to said address stored in said buffer, said cache control unit of said first processor writes data of said address stored in said buffer, into said cache line of said cache memory of said first processor.

15. The multiprocessor system as set forth in claim 10, in which the cache control unit specifies a data sharing processor, with reference to said share flag, when supplying a bus request, and supplies said bus request only to said data sharing processor.

16. The multiprocessor system as set forth in claim 10, in which when the execution of a thread is canceled in a thread executing processor and further canceled also in another processor that is the cause of a speculative cache line, of said speculative cache lines existing in said cache memory of said thread executing processor, said cache control unit of said thread executing processor invalidates the cache line.

17. A cache memory control system for a multiprocessor system including a plurality of processors each having a cache memory and a cache memory control unit, for executing a plurality of threads whose execution sequence is defined in a logical order, comprising:

each of said cache memories storing a plurality of cache lines, each of said cache lines including:

data fields for storing data of memory locations corresponding to the respective cache line;

a speculation field for each of said processors, the speculation field indicating whether or not said respective cache line is based on speculative processing performed by said each of said processors;

an update effective flag indicating whether or not said respective cache line has been updated by said corresponding processor of said cache memory that is performing a thread;

an update objective flag for each of remaining ones of said processors, indicating whether or not said respective cache line has been updated by said each of the remaining ones of said processors performing other threads, wherein, when a first of said processors executes a load instruction in a sequence of instructions being performed for a first thread according to speculative processing, said first processor checks the respective update effective flag and the respective update objective flags for the corresponding cache line to be loaded by way of the load instruction, and, if the update objective flag corresponding to a second of said processors executing a second thread prior in the execution sequence to the first thread being executed by said first processor is set, the cache line is determined to possibly be invalid, and wherein said cache memory control unit of said first processor then queries the corresponding cache memory of said second processor to determine where to obtain data for the load instruction requested by said first processor, and, a) if the speculative processing performed for the second thread by said second processor was conducted such that the corresponding cache line in the cache memory of said second processor was not updated, the data from the cache line of the cache memory of said first processor is provided to said first processor and is determined to be valid, and b) if the speculative processing performed by said second processor was conducted such that the corresponding cache line in the cache memory of said second processor was updated, the data from the corresponding cache line of said second processor is provided to said first processor instead and the corresponding cache line in the cache memory of said first processor is determined to definitely be invalid.

18. A cache memory control system for a multiprocessor system including a plurality of processors each having a cache memory and a cache memory control unit, for executing a plurality of threads whose execution sequence is defined in a logical order, comprising:

each of said cache memories storing a plurality of cache lines, each of said cache lines including:

data fields for storing data of memory locations corresponding to the respective cache line;

a speculation field for each of said processors, the speculation field indicating whether or not said respective cache line is based on speculative processing performed by said each of said processors;

an update effective flag indicating whether or not said respective cache line has been updated by the corresponding processor of said cache memory that is performing a thread;

an update objective flag for each of remaining ones of said processors, indicating whether or not said respective cache line has been updated by said each of the remaining ones of said processors performing other threads, wherein, when a first of said processors executes a store instruction in a sequence of instructions being performed for a first thread according to speculative processing, said first processor checks the respective update effective flag and the respective update objective flags for the corresponding cache line to have data stored therein by way of the store instruction, and, if the update objective flag corresponding to a second of said processors executing a second thread prior in the execution sequence to the first thread being executed by said first processor is set, the cache line is determined to possibly be invalid, and wherein said cache memory control unit of said first processor then queries the corresponding cache memory of said second processor to determine what data to store for the store instruction requested by said first processor, and, a) if the speculative processing performed for the second thread by said second processor was conducted such that the corresponding cache line in the cache memory of said second processor was not updated, the cache line of the cache memory of said first processor is updated based on data provided in the store instruction by said first processor and is determined to be valid, and b) if the speculative processing performed by said second processor was conducted such that the corresponding cache line in the cache memory of said second processor was updated, the data from the corresponding cache line of said second processor is used to fill the corresponding cache line of the cache memory of said first processor and the store instruction issued by said first processor is invalidated, and said first processor restarts execution of the first thread.

* * * * *